US011808469B2

(12) United States Patent
Graham et al.

(10) Patent No.: US 11,808,469 B2
(45) Date of Patent: *Nov. 7, 2023

(54) SYSTEM AND METHOD FOR CROWD-SOURCED ENVIRONMENTAL SYSTEM CONTROL AND MAINTENANCE

(71) Applicant: CrowdComfort, Inc., Boston, MA (US)

(72) Inventors: B. Eric Graham, Wenham, MA (US); Galen C. Nelson, Boston, MA (US); Chris Fuentes, Plaistow, NH (US); Kevin Loos, Cambridge, MA (US); Abdullah Daoud, Lynnfield, MA (US); Jeff McAulay, Cambridge, MA (US)

(73) Assignee: CrowdComfort, Inc., Wenham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,892

(22) Filed: Jul. 2, 2021

(65) Prior Publication Data
US 2021/0404682 A1 Dec. 30, 2021

Related U.S. Application Data

(63) Continuation of application No. 16/579,172, filed on Sep. 23, 2019, now Pat. No. 11,085,660, which is a (Continued)

(51) Int. Cl.
F24F 11/50 (2018.01)
G05B 15/02 (2006.01)
(Continued)

(52) U.S. Cl.
CPC .............. F24F 11/50 (2018.01); F24F 11/30 (2018.01); G05B 15/02 (2013.01); G05B 19/048 (2013.01);
(Continued)

(58) Field of Classification Search
CPC ........... F24F 11/30; F24F 11/52; G05B 15/02; G05B 19/048; G05B 19/124; G05B 2219/2614; G05B 23/0283; G06F 3/048
See application file for complete search history.

(56) References Cited

U.S. PATENT DOCUMENTS 5,565,855 A  10/1996 Knibbe
7,567,844 B2  7/2009 Thomas et al.
(Continued)

OTHER PUBLICATIONS

Pathak, P., et al—"Visible Light Communication, Networking, and Sensing: A Survey, Potential and Challenges", IEEE Communications Surveys and Tutorials. 2015;17(4):2047-2077.
(Continued)

Primary Examiner — Kidest Bahta
(74) Attorney, Agent, or Firm — Nutter McClennen & Fish LLP

(57) ABSTRACT

A system and method for crowd-sourced environmental system control and building maintenance includes a server for providing selective access to building occupants and managers. Users are permitted to generate building reports in the form of (i) thermal reports using a thermal report module, and/or (ii) maintenance reports using a maintenance report module. The reports are each geo-located to locations within the building, and are then captured, stored, and aggregated at the server. The aggregated reports are sorted according to their geo-locations and comfort rules are used to (i) permit a manager at a client computer to access the server to respond, and/or (ii) automatically respond and assign a response status to particular reports. An inspection checklist interface is generated and populated to display a list of preventative maintenance tasks, each of the tasks being user-selectable to designate completion, with the updated status of the reports being stored at the server.

25 Claims, 26 Drawing Sheets

Related U.S. Application Data continuation of application No. 15/611,295, filed on Jun. 1, 2017, now Pat. No. 10,422,542, which is a continuation of application No. 15/472,913, filed on Mar. 29, 2017, now Pat. No. 10,215,435, which is a continuation of application No. 14/328,492, filed on Jul. 10, 2014, now Pat. No. 9,625,922.

(60) Provisional application No. 61/903,123, filed on Nov. 12, 2013, provisional application No. 61/844,494, filed on Jul. 10, 2013.

(51) Int. Cl.
  *G05D 23/19* (2006.01)
  *G06F 3/0481* (2022.01)
  *F24F 11/30* (2018.01)
  *G05B 19/048* (2006.01)
  *G05B 19/12* (2006.01)
  *G05B 23/02* (2006.01)
  *F24F 11/52* (2018.01)

(52) U.S. Cl.
  CPC ....... *G05B 19/124* (2013.01); *G05B 23/0283* (2013.01); *G05D 23/1917* (2013.01); *G05D 23/1927* (2013.01); *G06F 3/0481* (2013.01); *F24F 11/52* (2018.01); *G05B 2219/2614* (2013.01)

(56) References Cited

U.S. PATENT DOCUMENTS

| | | | |
|---|---|---|---|
| 8,091,795 B1 | 1/2012 | McLellan et al. |
| 8,108,144 B2 | 1/2012 | Forstall et al. |
| 8,175,802 B2 | 5/2012 | Forstall et al. |
| 8,260,320 B2 | 9/2012 | Herz |
| 8,275,352 B2 | 9/2012 | Forstall et al. |
| 8,275,399 B2 | 9/2012 | Karmarkar et al. |
| 8,290,513 B2 | 10/2012 | Forstall et al. |
| 8,311,526 B2 | 11/2012 | Forstall et al. |
| 8,320,939 B1 | 11/2012 | Vincent |
| 8,332,402 B2 | 12/2012 | Forstall et al. |
| 8,350,758 B1 | 1/2013 | Parvizi et al. |
| 8,355,862 B2 | 1/2013 | Matas et al. |
| 8,369,867 B2 | 2/2013 | Van Os et al. |
| 8,548,494 B2 | 10/2013 | Agarwal et al. |
| 8,630,714 B1 | 1/2014 | Webb |
| 8,644,843 B2 | 2/2014 | Canon et al. |
| 8,712,690 B1 | 4/2014 | White et al. |
| 8,717,193 B2 | 5/2014 | Velusamy |
| 8,757,507 B2 | 6/2014 | Fadell et al. |
| 8,843,304 B1 | 9/2014 | Dupont et al. |
| 8,929,849 B1 | 1/2015 | Dudziak |
| 9,031,579 B2 | 5/2015 | Schwent et al. |
| 9,042,876 B2 | 5/2015 | Buck et al. |
| 9,066,199 B2 | 6/2015 | Forstall et al. |
| 9,224,206 B1 | 12/2015 | Lookingbill et al. |
| 9,247,520 B2 | 1/2016 | Malik |
| 9,301,100 B1 | 3/2016 | Jampani et al. |
| 9,354,778 B2 | 5/2016 | Cornaby et al. |
| 9,392,570 B1 | 7/2016 | Zhang |
| 9,407,728 B2 | 8/2016 | Marshall et al. |
| 9,494,589 B2 | 11/2016 | Addington et al. |
| 9,519,065 B2 | 12/2016 | Henry et al. |
| 9,558,399 B1 | 1/2017 | Jeka et al. |
| 9,565,521 B1 | 2/2017 | Srinivasan et al. |
| 9,589,269 B2 | 3/2017 | Henderson et al. |
| 9,625,922 B2 | 4/2017 | Graham et al. |
| 9,661,120 B1 | 5/2017 | Skeffington |
| 9,681,468 B2 | 6/2017 | Lee et al. |
| 9,733,091 B2 | 8/2017 | Kordari et al. |
| 9,799,034 B1 | 10/2017 | Varma et al. |
| 9,846,222 B2 | 12/2017 | Ryan et al. |
| 10,070,280 B2 | 9/2018 | Daoud et al. |
| 10,103,810 B2 | 10/2018 | Kido et al. |
| 10,122,451 B2 | 11/2018 | Ankarali et al. |
| 10,149,114 B2 | 12/2018 | Daoud et al. |
| 10,171,646 B2 | 1/2019 | Daoud |
| 10,185,921 B1 | 1/2019 | Heller et al. |
| 10,215,435 B2 | 2/2019 | Graham et al. |
| 10,248,403 B2 | 4/2019 | Gross et al. |
| 10,379,551 B2 | 8/2019 | Daoud et al. |
| 10,382,911 B2 | 8/2019 | Daoud et al. |
| 10,383,198 B2 | 8/2019 | Verbrugh et al. |
| 10,422,542 B2 | 9/2019 | Graham et al. |
| 10,541,751 B2 | 1/2020 | Daoud et al. |
| 10,715,653 B2 | 7/2020 | Daoud |
| 10,796,085 B2 | 10/2020 | Daoud et al. |
| 10,802,515 B2 | 10/2020 | Mirza et al. |
| 10,841,741 B2 | 11/2020 | Daoud et al. |
| 10,958,341 B2 | 3/2021 | Daoud et al. |
| 10,963,928 B2 | 3/2021 | Sundaresan |
| 11,085,660 B2 | 8/2021 | Graham et al. |
| 11,181,936 B2 | 11/2021 | Daoud et al. |
| 11,215,967 B2 | 1/2022 | Kempf et al. |
| 11,323,853 B2 | 5/2022 | Daoud et al. |
| 11,379,658 B2 | 7/2022 | Daoud et al. |
| 11,394,462 B2 | 7/2022 | Graham et al. |
| 11,394,463 B2 | 7/2022 | Daoud et al. |
| 2002/0152289 A1 | 10/2002 | Dube |
| 2003/0233432 A1 | 12/2003 | Davis et al. |
| 2004/0114731 A1 | 6/2004 | Gillett et al. |
| 2005/0186969 A1 | 8/2005 | Lohtia |
| 2006/0142880 A1 | 6/2006 | Deen et al. |
| 2006/0146837 A1 | 7/2006 | Atsuki et al. |
| 2006/0235690 A1 | 10/2006 | Tomasic et al. |
| 2007/0043477 A1 | 2/2007 | Ehlers et al. |
| 2007/0219645 A1* | 9/2007 | Thomas ............. G05B 15/02 700/29 |
| 2008/0052159 A1 | 2/2008 | Balakrishnan et al. |
| 2008/0065456 A1* | 3/2008 | Labedz ............. G06Q 10/06 709/229 |
| 2009/0119142 A1 | 5/2009 | Yenni et al. |
| 2009/0138965 A1 | 5/2009 | Ferlitsch |
| 2009/0157309 A1 | 6/2009 | Won et al. |
| 2009/0307255 A1 | 12/2009 | Park |
| 2010/0075628 A1 | 3/2010 | Ye |
| 2010/0286937 A1* | 11/2010 | Hedley ............. G06Q 50/06 702/60 |
| 2010/0289643 A1 | 11/2010 | Trundle et al. |
| 2011/0115816 A1 | 5/2011 | Brackney |
| 2011/0218839 A1 | 9/2011 | Shamaiengar |
| 2011/0313660 A1 | 12/2011 | Won et al. |
| 2011/0319060 A1 | 12/2011 | Gentemann |
| 2012/0013475 A1 | 1/2012 | Farley et al. |
| 2012/0026530 A1 | 2/2012 | Tsongas et al. |
| 2012/0046860 A1 | 2/2012 | Curtis et al. |
| 2012/0089325 A1 | 4/2012 | Won et al. |
| 2012/0154169 A1 | 6/2012 | Hoekstra |
| 2012/0179296 A1 | 7/2012 | Han et al. |
| 2012/0181330 A1 | 7/2012 | Kim |
| 2012/0233538 A1 | 9/2012 | Negoro |
| 2012/0259583 A1 | 10/2012 | Noboa et al. |
| 2012/0310602 A1 | 12/2012 | Jacobi et al. |
| 2013/0032634 A1 | 2/2013 | McKirdy |
| 2013/0052946 A1 | 2/2013 | Chatterjee et al. |
| 2013/0059598 A1* | 3/2013 | Miyagi ............. H04W 4/023 455/456.1 |
| 2013/0084891 A1 | 4/2013 | Khorashadi et al. |
| 2013/0094538 A1 | 4/2013 | Wang |
| 2013/0109413 A1 | 5/2013 | Das et al. |
| 2013/0132438 A1 | 5/2013 | Park et al. |
| 2013/0144546 A1 | 6/2013 | Brackney et al. |
| 2013/0159119 A1 | 6/2013 | Henderson et al. |
| 2013/0169681 A1* | 7/2013 | Rasane ............. G06T 19/003 345/633 |
| 2013/0244686 A1 | 9/2013 | Saha et al. |
| 2013/0263160 A1 | 10/2013 | Sandholm et al. |
| 2013/0290707 A1 | 10/2013 | Sinclair et al. |
| 2013/0304758 A1 | 11/2013 | Gruber et al. |
| 2013/0304894 A1 | 11/2013 | Kim |
| 2014/0098247 A1 | 4/2014 | Rao et al. |
| 2014/0236759 A1 | 8/2014 | Mirabile |

(56) References Cited

U.S. PATENT DOCUMENTS

| | | |
|---|---|---|
| 2014/0278060 A1 | 9/2014 | Kordari et al. |
| 2014/0280316 A1 | 9/2014 | Ganick et al. |
| 2014/0281490 A1 | 9/2014 | Prakash et al. |
| 2014/0286644 A1 | 9/2014 | Oshima et al. |
| 2014/0290138 A1 | 10/2014 | Oshima et al. |
| 2014/0347492 A1 | 11/2014 | Fales |
| 2014/0358291 A1 | 12/2014 | Wells |
| 2015/0009348 A1 | 1/2015 | Vartanian et al. |
| 2015/0032264 A1 | 1/2015 | Emmons et al. |
| 2015/0052462 A1 | 2/2015 | Kulkarni |
| 2015/0067351 A1 | 3/2015 | Wang et al. |
| 2015/0081107 A1 | 3/2015 | Graham et al. |
| 2015/0161440 A1 | 6/2015 | Chao et al. |
| 2015/0163345 A1 | 6/2015 | Cornaby et al. |
| 2015/0168174 A1 | 6/2015 | Abramson et al. |
| 2015/0204676 A1 | 7/2015 | Zhang et al. |
| 2015/0248917 A1 | 9/2015 | Chang et al. |
| 2015/0253144 A1 | 9/2015 | Rau et al. |
| 2015/0316383 A1 | 11/2015 | Donikian |
| 2016/0025498 A1 | 1/2016 | Le Grand |
| 2016/0026837 A1 | 1/2016 | Good et al. |
| 2016/0044467 A1 | 2/2016 | Clausen |
| 2016/0066151 A1 | 3/2016 | Palanki et al. |
| 2016/0071319 A1 | 3/2016 | Fallon et al. |
| 2016/0084658 A1 | 3/2016 | Chao et al. |
| 2016/0164993 A1 | 6/2016 | Aizenberg et al. |
| 2016/0174032 A1 | 6/2016 | Xin et al. |
| 2016/0191155 A1 | 6/2016 | Oshima et al. |
| 2016/0210647 A1 | 7/2016 | Chang et al. |
| 2016/0210790 A1 | 7/2016 | Rasane et al. |
| 2016/0266889 A1 | 9/2016 | Gross et al. |
| 2016/0323690 A1 | 11/2016 | Daoud et al. |
| 2016/0352421 A1 | 12/2016 | Oshima et al. |
| 2016/0360367 A1 | 12/2016 | Shankaranarayanan et al. |
| 2017/0010936 A1 | 1/2017 | Daoud et al. |
| 2017/0013416 A1 | 1/2017 | Daoud et al. |
| 2017/0026804 A1 | 1/2017 | Tsai et al. |
| 2017/0074659 A1 | 3/2017 | Giurgiu et al. |
| 2017/0099102 A1 | 4/2017 | Oshima et al. |
| 2017/0123440 A1 | 5/2017 | Mangsuli et al. |
| 2017/0141848 A1 | 5/2017 | Daoud et al. |
| 2017/0177723 A1 | 6/2017 | Price et al. |
| 2017/0198937 A1 | 7/2017 | Graham et al. |
| 2017/0230118 A1 | 8/2017 | Shatz et al. |
| 2017/0238153 A1 | 8/2017 | Daoud et al. |
| 2017/0245104 A1 | 8/2017 | Klimek et al. |
| 2017/0268798 A1 | 9/2017 | Graham et al. |
| 2017/0269617 A1 | 9/2017 | Daoud et al. |
| 2017/0318149 A1 | 11/2017 | Daoud |
| 2017/0371024 A1 | 12/2017 | Ivanov et al. |
| 2019/0020981 A1 | 1/2019 | Daoud et al. |
| 2019/0266404 A1 | 8/2019 | Spivack et al. |
| 2019/0306303 A1 | 10/2019 | Daoud |
| 2020/0159263 A1 | 5/2020 | Daoud et al. |
| 2020/0162860 A1 | 5/2020 | Daoud et al. |
| 2020/0213006 A1 | 7/2020 | Graham et al. |
| 2020/0224902 A1 | 7/2020 | Graham et al. |
| 2021/0056260 A1 | 2/2021 | Daoud et al. |
| 2021/0067916 A1 | 3/2021 | Daoud et al. |
| 2021/0297154 A1 | 9/2021 | Daoud et al. |
| 2021/0400195 A1 | 12/2021 | Adato et al. |
| 2022/0004683 A1 | 1/2022 | Crabtree et al. |
| 2022/0155806 A1 | 5/2022 | Daoud et al. |
| 2022/0222724 A1 | 7/2022 | Graham |
| 2022/0405470 A1 | 12/2022 | Daoud et al. |
| 2022/0407598 A1 | 12/2022 | Graham et al. |
| 2022/0407599 A1 | 12/2022 | Daoud et al. |

OTHER PUBLICATIONS

Non-Final Office Action for U.S. Appl. No. 17/856,490 dated Oct. 26, 2022 (12 pages).

* cited by examiner

44

| PropertyID | Location ID / QR | Property Rules | Room Type | Report content / User ID of report generator |
|---|---|---|---|---|
| 1 | 1 | 1001 | Conference | xyz.... |
| 1 | 2 | 1002 | Office | xyz.... |
| 1 | 3 | 1003 | Common | source="xyz.gif" |
| 1 | 4 | 1004 | Office | xyz.. |
| 2 | 1 | 1005 | Conference | xyz.. |
| etc.. | etc.. | etc.. | | |

Fig. 4A

|  | Totals | Pole results | | |
| --- | --- | --- | --- | --- |
|  |  | Increase | Decrease | No Change |
| people who work in the zone | 38 |  |  |  |
| people responding to the temperature adjustment initiation | 30 | 20 | 5 | 5 |
| Weighting |  | 0.67 | 0.17 | 0.17 |
| Increase/-decrease weighting | 0.50 | 0.58 | 0.08 |  |
| Max Change in degrees F | 5.00 |  |  |  |
| Recommended Change | 2.50 |  |  |  |
| Recommended Change (Rounded) | 2.50 | Recommended increase in temperature | | |

Fig. 4D

- View your reports here
- Select '+' to add report

- Scan QR code or manually look up

- Choose thermal or maintenance report
- Geo-located maintenance reporting was added to increase the value of the reporting functionality for facilities management staff and increase occupancy usage rates of the application.

- Option to include text and/or take an image to add to the report.

- See report activity around you
- Option to 'agree' or comment on reports

- See reports that received the most 'agrees' in your area

Once a deficiency or maintenance issue is reported, managers can address these issues on the fly.

*Add a comment*  *Change report status*  *Assign report*

- In notification center, select 'assigned to me'
- View and manage reports that have been assigned to you

- Identify what asset you are inspecting
- App populates appropriate checklist
- Once complete, data is aggregated, analyzed, and stored on the cloud ically coupled to the server, the users including (i) occupants of the building having first level permissions and (ii) managers having second level permissions, wherein said selective access is granted based on said permissions. A report access module actuatable by the users after having gained access to the server, is configured to generate a report interface displayable on the client computers to enable the users to generate one or more building reports in the form of (i) thermal reports using a thermal report module, and/or (ii) 
SYSTEM AND METHOD FOR CROWD-SOURCED ENVIRONMENTAL SYSTEM CONTROL AND MAINTENANCE

RELATED APPLICATIONS

This application is a continuation of U.S. patent application Ser. No. 16/579,172, filed Sep. 23, 2019, which is a continuation of U.S. patent application Ser. No. 15/611,295, filed Jun. 1, 2017 (now issued as U.S. Pat. No. 10,422,542), which is a continuation of U.S. patent application Ser. No. 15/472,913, filed Mar. 29, 2017 (now issued as U.S. Pat. No. 10,215,435), which is a continuation of U.S. patent application Ser. No. 14/328,492, filed Jul. 10, 2014 (now issued as U.S. Pat. No. 9,625,922), which claims the benefit of and priority to U.S. Provisional Patent Application No. 61/844,494, filed on Jul. 10, 2013, and also claims the benefit of and priority to U.S. Provisional Patent Application No. 61/903,123, filed on Nov. 12, 2013, the contents of each of which are incorporated herein by reference in their entireties for all purposes.

TECHNICAL FIELD

This invention relates to web-enabled transactions for building system control, and more particularly to an automated system for crowd-sourced report generation, aggregation, and response for building systems.

BACKGROUND INFORMATION

Residential and commercial building occupants are often frustrated by comfort challenges, but feel powerless. At the same time, discomfort triggers—space is too hot, or too cold, or too drafty, can often signal poor HVAC design, operation, maintenance, or the need for other cost effective energy efficiency improvements. For many larger commercial buildings occupant discomfort related to temperature or other air quality issues, is a sign of an inefficient or poorly commissioned or ventilated building, or unresponsive/improperly designed or maintained HVAC controls. These conditions often lead to overheating or overcooling, causing occupants discomfort or in some cases, breathing difficulties.

A need exists for an efficient system and method capable of capturing, analyzing, and aggregating comfort and maintenance information from building occupants to produce actionable feedback to building personnel.

SUMMARY

In one aspect of the invention, a computer implemented system in a client-server environment, for crowd-sourced environmental system control and maintenance at a particular building, includes a computer server having a processor configured to process a series of modules. One of the modules is a login module configured to provide selective access to users via one or more client computers communicably coupled to the server, the users including (i) occupants of the building having first level permissions and (ii) managers having second level permissions, wherein said selective access is granted based on said permissions. A report access module actuatable by the users after having gained access to the server, is configured to generate a report interface displayable on the client computers to enable the users to generate one or more building reports in the form of (i) thermal reports using a thermal report module, and/or (ii) maintenance reports using a maintenance report module. A geo-location module is configured to assign a location within the building to each building report. An aggregation module is configured to capture, store, and aggregate the building reports at the server. A View/Sort module is configured to sort the aggregated reports according to their assigned locations, and to transmit the sorted reports to the one or more client computers for display. A rule storage module is configured to store a set of comfort rules for the building, while a Response/Notification module is configured to (i) permit a manager at a client computer to access the server to select for response, and assign a response status, to particular reports, and/or (ii) automatically respond and assign a response status to particular reports in accordance with said set of comfort rules. A checklist storage module is configured to store a list of preventative maintenance items for the building. An inspection module is configured to generate and populate a checklist interface on the user device, the checklist interface configured to display the list of preventative maintenance tasks, each of the tasks being user-selectable to designate completion of each individual task. The aggregation module is further configured to store the status of the reports.

Another aspect of the invention is a computer implemented method in a client-server environment, for crowd-sourced environmental system control and maintenance at a particular building. The method includes using a computer server having a processor to perform a series of operations, including actuating a login module to provide selective access to users via one or more client computers communicably coupled to the server, the users including (i) occupants of the building having first level permissions and (ii) managers having second level permissions, wherein said selective access is granted based on said permissions. Additional operations include enabling users after having gained access to the server, to actuate a report access module to generate a report interface displayable on the client computers to enable the users to generate one or more building reports in the form of (i) thermal reports using a thermal report module, and/or (ii) maintenance reports using a maintenance report module. A geo-location module is actuated to assign a location within the building to each building report. An aggregation module is actuated to receive the building reports from the client computers, and to store and aggregate the building reports at the server. The method further includes actuating a View/Sort module to sort the aggregated reports according to their assigned locations, and to transmit the sorted reports to the one or more client computers for display, and actuating a rule storage module to store a set of comfort rules for the building. A Response/Notification module is actuated to (i) permit a manager at a client computer to access the server to select for response, and assign a response status, to particular reports, and/or (ii) automatically respond and assign a response status to particular reports in accordance with said set of comfort rules. A checklist storage module is actuated to store a list of preventative maintenance items for the building, and an inspection module is actuated to generate and populate a checklist interface on the user device, the checklist interface being configured to display the list of preventative maintenance tasks, each of the tasks being user-selectable to designate completion of each individual task. The aggregation module is then used to store the status of the reports.

In still another aspect of the invention, an article of manufacture for crowd-sourced environmental system control and maintenance at a particular building, in a client-server environment, includes a computer usable medium having a computer readable program code embodied therein, for performing a series of operations, including actuating a login module to provide selective access to users via one or more client computers communicably coupled to the server, the users including (i) occupants of the building having first level permissions and (ii) managers having second level permissions, wherein said selective access is granted based on said permissions. Additional operations include enabling users after having gained access to the server, to actuate a report access module to generate a report interface displayable on the client computers to enable the users to generate one or more building reports in the form of (i) thermal reports using a thermal report module, and/or (ii) maintenance reports using a maintenance report module. A geolocation module is actuated to assign a location within the building to each building report. An aggregation module is actuated to receive the building reports from the client computers, and to store and aggregate the building reports at the server. The method further includes actuating a View/Sort module to sort the aggregated reports according to their assigned locations, and to transmit the sorted reports to the one or more client computers for display, and actuating a rule storage module to store a set of comfort rules for the building. A Response/Notification module is actuated to (i) permit a manager at a client computer to access the server to select for response, and assign a response status, to particular reports, and/or (ii) automatically respond and assign a response status to particular reports in accordance with said set of comfort rules. A checklist storage module is actuated to store a list of preventative maintenance items for the building, and an inspection module is actuated to generate and populate a checklist interface on the user device, the checklist interface being configured to display the list of preventative maintenance tasks, each of the tasks being user-selectable to designate completion of each individual task. The aggregation module is then used to store the status of the reports.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 4A is a diagrammatic representation of one embodiment of a property information table within the database;

FIG. 4D is a table populated with data and rules in accordance with embodiments of the present invention;

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "a facility" includes a plurality of such facility. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

A method and apparatus for providing automated report generation, aggregation, and response, in a network-based transaction facility are described. In the following description, for purposes of explanation, numerous specific details are set forth in order to provide a thorough understanding of the present invention. It will be evident, however, to one skilled in the art that the present invention may be practiced without these specific details.

Figure 1A:
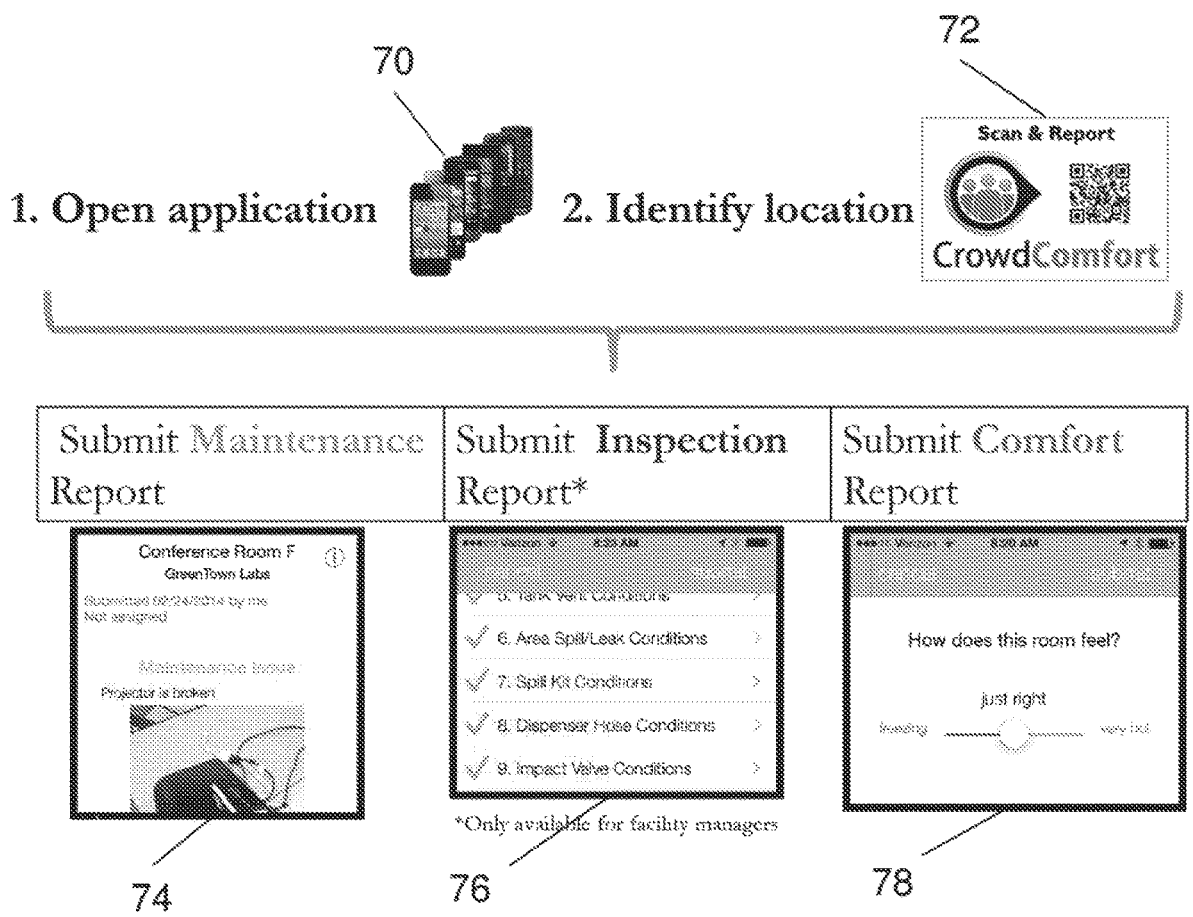
FIG. 1A is a schematic representation of aspects of an embodiment of the present invention.

Referring to FIG. 1A, embodiments of the present invention offer building owners, operators, and occupants a new and powerful way to share information about comfort, maintenance, and safety issues with an easy to use smart device application. These embodiments convert this crowd sourced feedback into time stamped, geo-located aggregated reports/maps, which are actionable through a custom portal allowing building owners or facility managers to respond more rapidly and cost effectively to occupant concerns. These embodiments democratize and amplify the voices of building occupants, while helping building owners to pinpoint energy and operational saving opportunities. Referring to FIG. 1A, users may open application 70, identify a location 72, e.g., by scanning a QR Code, and generate a maintenance report 74, an inspection report 76 and/or a comfort report 78.

Figure 1B:
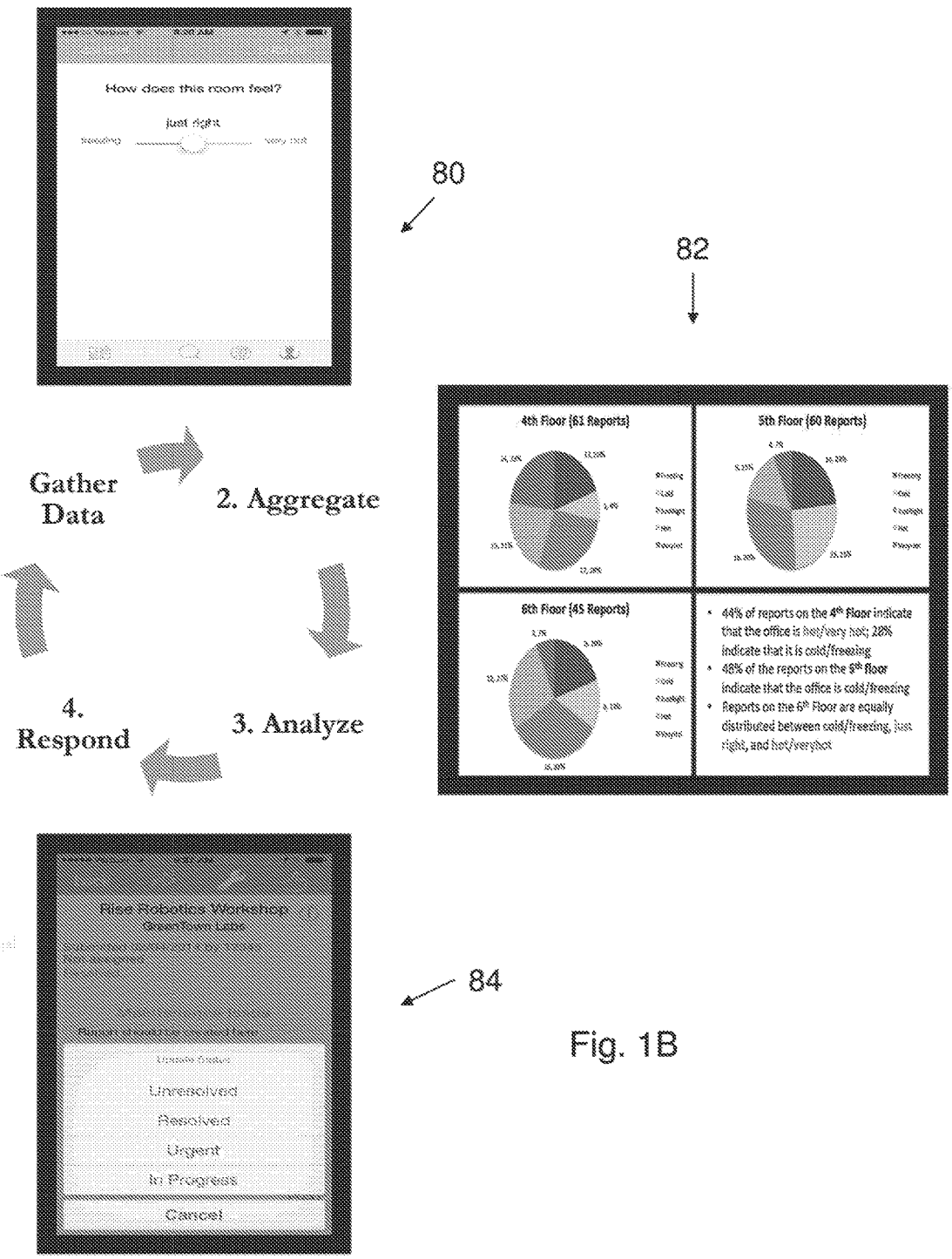
FIG. 1B is a schematic representation of aspects of an embodiment of the present invention.

Referring now to FIG. 1B, once these reports are collected at 80, they are aggregated and analyzed (e.g., mapped) based on location at 82, and then automatically communicated to an appropriate recipient for response 84. In these embodiments, thermal comfort is facilitated by leveraging the power of employees to identify energy savings opportunities, improve comfort and worker productivity. Facilities management is facilitated by collecting, aggregating, and delivering real-time, geo-located reports on comfort and maintenance issues. Environmental compliance and inspection is facilitated by replacing the clipboard with real-time, site-specific environmental compliance reporting.

Various embodiments operate by initially having facility managers identify locations for data collection in and/or around particular properties. Markers are printed, delivered, and placed at the identified locations. Employees/Inspectors are notified, asked to download the application, and begin reporting. Facilities managers gain instant access to the secure portal where the data is aggregated and displayed. From the inventive platform, maintenance reports are converted into work orders that can be efficiently organized, addressed, and stored. As these reports are processed the employees who filed them are notified of progress through their phones. In particular embodiments, building systems are adjusted automatically in response to the aggregated, geo-located reports.

Potential benefits include: engaging employees and making them part of the solution; improving health, safety and security within an organization; collection of meaningful data that can be leveraged to support high-impact recommendations; use of predictive analytics to identify maintenance needs before they become problems; and/or optimization of workflow efficiency for building maintenance.

Reporting comfort and/or maintenance issues is simply the first step. By capturing and highlighting occupant discomfort, occupants can provide a compelling feedback loop to building owners—and the cloud—to address these problems and reduce energy consumption, while improving building occupants' comfort. Initial embodiments may simply provide crowd sourced feedback to building facility managers/owners informing them the extent to which building HVAC system design, set points, and overall operation is meeting occupant comfort expectations. Ultimately, crowd sourced reactions would directly influence or directly control HVAC operation (temperature and humidity levels) alongside required ventilation/air exchange rates (e.g. ASHRAE standards 62.1 and 90.1) to better match the comfort needs of a preponderance of building occupants by tying feedback directly to the building's energy management system. For example, if 90% of the occupants in a convention center feel too chilly, air conditioning set points may be raised slightly and energy consumption reduced.

Particular embodiments capture crowd sourced comfort level information periodically via a simple icon based interface. Occupants may receive a simple periodic query—perhaps via text message, via Twitter, or other platforms—asking them to characterize their comfort level (e.g. very cold, somewhat cold, comfortable, warm, very warm). Users may then respond using the system interface shown and described herein. Taken together, this data would inform building facility managers, and directly influence building HVAC set points. Looking beyond the building boundary, in various embodiments, this aggregated data may be shared on-line in a Google maps-type interface where users could mouse over buildings and see reports in the aggregate (e.g. how many, and when, users reported being uncomfortable). These reports would be updated over time based on user feedback. Such user feedback would motivate building owners to react, due to the potential positive or negative occupant ratings that could have a real effect on the property's value. At the same time, building owners could voluntarily report improvement they had made to their buildings at the same web based platform. These embodiments would thus actively support building owners who take proactive steps to provide the most comfortable and energy efficient buildings.

Application deployment/partnership options may include: Event registration sites; Employer databases/corporate sustainability leadership; Hotels; Public Transit/trains, etc. Additional applications may include power supply impacts—facility owners, utilities, and grid operators could use this platform to communicate important grid and air quality data to building occupants. For example, a preponderance of building occupants might be willing to tolerate a slightly higher indoor temperature during a hot summer day if they knew that by shedding that load, grid operators could avoid starting coal fired peaking power plants. In other words, these embodiments may complement and augment existing demand response programs.

Also, by use of relatively high resolution location data, e.g., by use of QR Codes, microGPS, etc., facility operators may begin to better understand HVAC design and operation problems at the distribution level, targeting solutions such as more localized controls, VAV (Variable Air Volume) box operation, or other conditions (e.g. excessive passive solar) addressing tenant comfort concerns and related energy use.

Building owners and users could capture more value from the app over time by pushing more and more sophisticated questions to app users, particularly repeat users, including questions like: "how would you rate the air quality in your building?" Occupants who participate in using these embodiments will be providing valuable data on the building systems, but will also be educating building managers about their preferences. This understanding will allow building owners and employers to place workers in environments with similar temperature preferences to potentially improve work satisfaction and productivity. Repeat users may build a profile and climate preference.

Terminology

For the purposes of the present specification, the term "transaction" shall be taken to include any communications between two or more entities and shall be construed to include, but not be limited to, transferring data including reports and responses between computers, downloading software applications or "apps" including graphical user interface components, and commercial transactions including sale and purchase transactions, and the like.

As used herein, the terms "computer" and "end-user device" are meant to encompass a workstation, personal computer, personal digital assistant (PDA) or smart phone, wireless telephone, tablet, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. Terms such as "component," "module", "control components/devices," "messenger component or service," and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the figures, embodiments of the present invention will be more thoroughly described.

Transaction Facility

FIG. 1 is a block diagram illustrating an exemplary network-based transaction facility in the form of an Internet-based report generation and aggregation facility 10. The report facility 10 includes one or more of a number of types of front-end servers, namely page servers 12 that deliver web pages (e.g., markup language reports), picture servers 14 that dynamically deliver images to be displayed within Web pages, CGI (Common Gateway Interface) servers 18 that provide an intelligent interface to the back-end of facility 10, and search servers 20 that handle search requests to the facility 10. E-mail/communication servers 21 provide, inter alia, automated e-mail (and optionally, text and/or social media) communications to users of the facility 10. The back-end servers may include a database engine server 22, a search index server 24 and a payment (e.g., credit card and/or subscription) database server 26, each of which may maintain and facilitate access to a respective database. Facility 10 may also include an administrative application server 28 configured to provide various administrative functions.

The network-based report generation and aggregation facility 10 may be accessed by a client program 30, such as a browser (e.g., the Internet Explorer distributed by Microsoft) that executes on a client machine 32 such as a smart phone, and accesses the facility 10 via a network such as, for example, the Internet 34. Other examples of networks that a client may utilize to access the facility 10 include a wide area network (WAN), a local area network (LAN), a wireless network (e.g., a cellular network), or the Plain Old Telephone Service (POTS) network.

Database Structure

Figure 2:
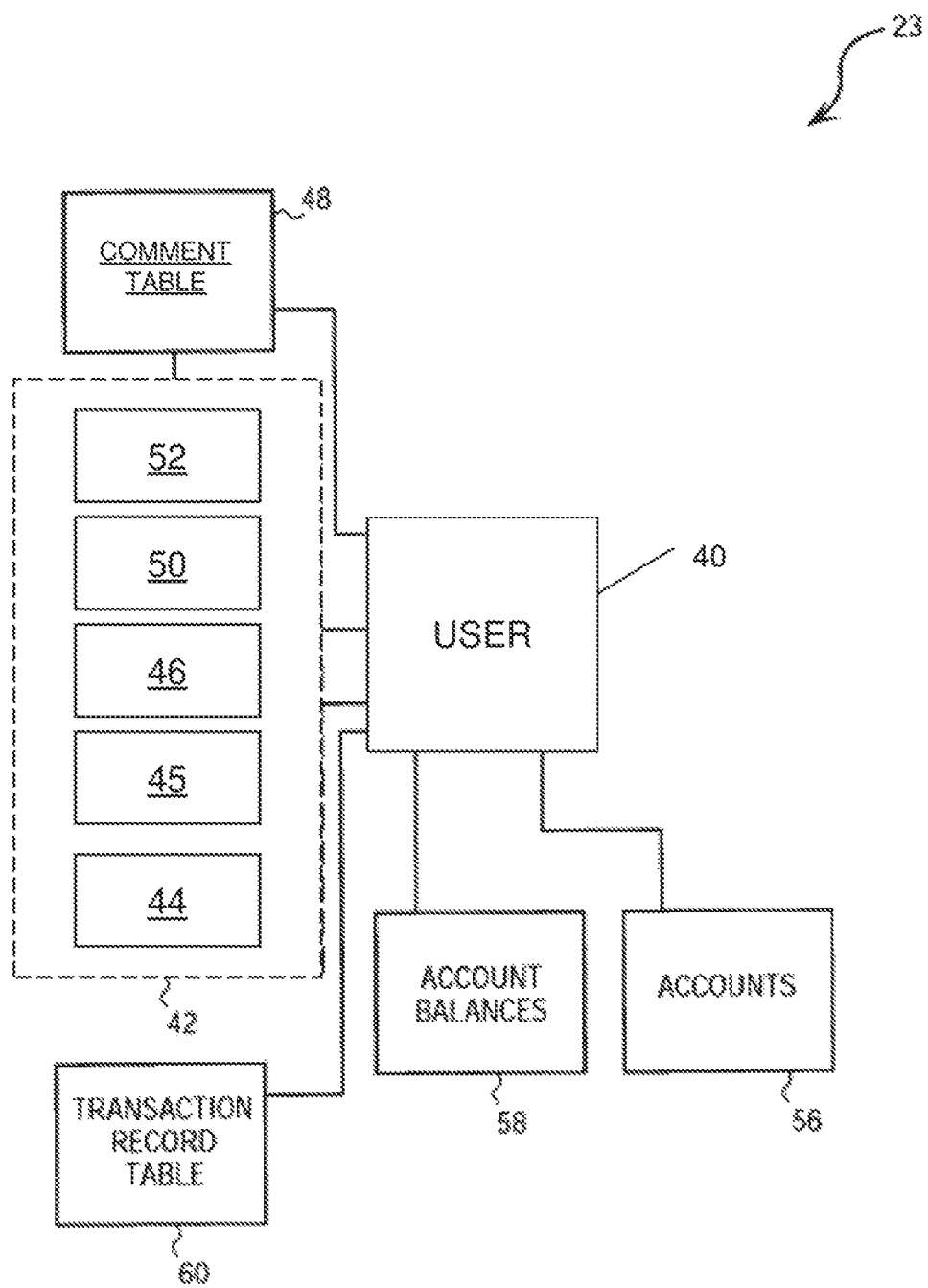
FIG. 2 is a block diagram of one embodiment of a database maintained by a database engine server.

FIG. 2 is a database diagram illustrating an exemplary database 23, maintained by and accessed via the database engine server 22, which at least partially implements and supports the report generation and aggregation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each user of the facility 10. The database 23 also includes tables 42 that may be linked to the user table 40. Specifically, the tables 42 may include property report (e.g., geo-located building report) table 44, and various property specific tables, such as a building locations table 45, inspection list table 46, comfort rules table 50, and a user-customizable table 52. A user record in the user table 40 may be linked to multiple reports that are being, or have been, generated via the facility 10 and for which records exist within the report tables 42. The database 23 may also include a comment table 48 populatable with comment records that may be linked to one or more report records within the report tables 42. A number of other tables may also be linked to the user table 40, such as an accounts table 56, an account balances table 58 and a transaction record table 60.

Figure 3:
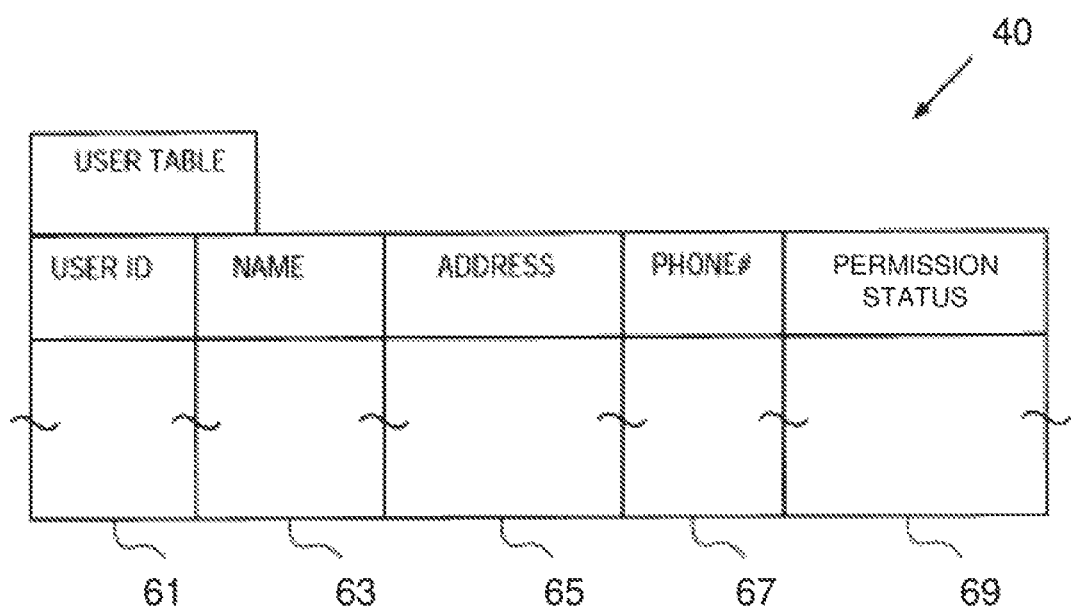
FIG. 3 is a diagrammatic representation of one embodiment of a user table within the database.

FIG. 3 is a diagrammatic representation of an exemplary embodiment of the user table 40 that is populated with records, or entries, for each user of the facility 10. As shown, table 40 includes a user identifier column 61 that stores a unique identifier for each user. A name column 63 may store a first name, a middle initial and a last name for each user. An address column 65 may store address information and/or other contact information for each user, e.g. an employer name, and/or street name and number, city, zip code, state, email address, etc. A phone number column 67 stores a phone (e.g., mobile) number for each user. A permission status column 69 may store, for each user, a value identifying the user's permission status, i.e., the user's ability to access particular features of the system, such as those typically provided to a manager or other user tasked with responding to particular reports, etc. It should be recognized that the amount of information stored may vary depending on the permission level assigned to the particular user. Table 40 may also store any additional information that may be desired for particular applications. For example, subscription information may be recorded (not shown), in which different values may be assigned to indicate whether a user has a currently valid subscription, has an expired subscription (which may provide only limited access to facility 10). It will be appreciated that any information other than that described above may populate the user table 40 without loss of generality.

FIG. 4A is a diagrammatic representation of an exemplary embodiment of a table 44 populated with property report records generated during use of the report generation facility 10. As shown, table 44 includes a property ID column 60 to identify particular properties, a location ID/QR column 62 to track particular locations, e.g., as designated with a QR Code or similar tag placed at the location, a property rules column 64 to provide a pointer or other reference to maintenance lists 45, inspection lists 46, comfort rules tables 50, and/or user-customizable table 52, associated with the particular property. A room type column 66 provides the type of space tagged by the QR Code, e.g., conference room, private office, etc. Report content column 68 is populated with the actual content of a report generated by the system, along with the User ID of the individual responsible for generating the report.

It will be appreciated that in particular embodiments, other descriptive information may also populate table 44, without departing from the scope of the present invention. For example, additional columns may be provided to capture information regarding the number of employees typically occupying a particular room type, and/or the number of rooms of a particular room type in the property or HVAC zone. Yet another column, for example, may identify the HVAC zone within which a particular location ID/QR Code is located.

Figure 4B:
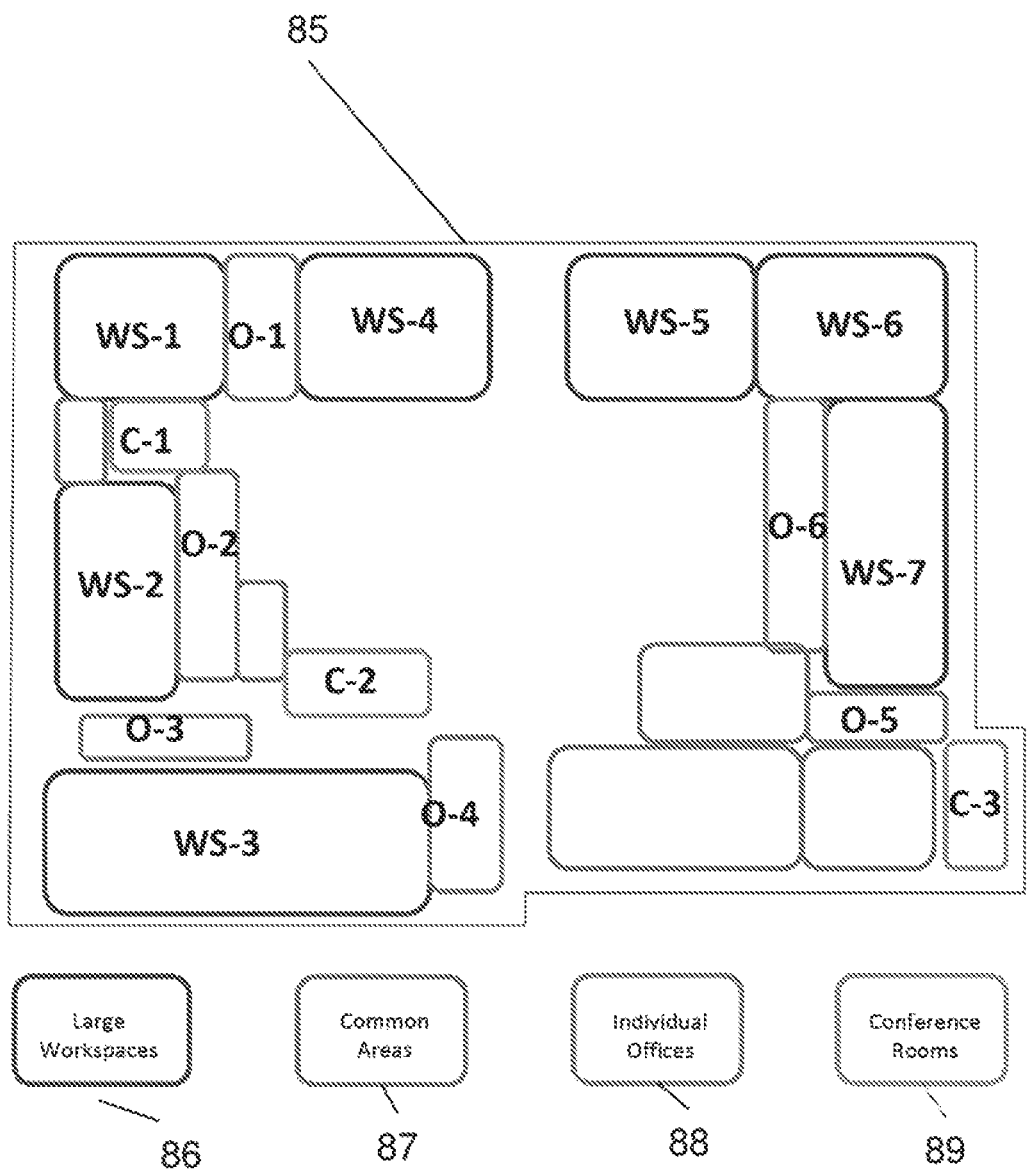
FIG. 4B is a schematic representation of a floor plan usable with embodiments of the present invention.
Figure 4C:
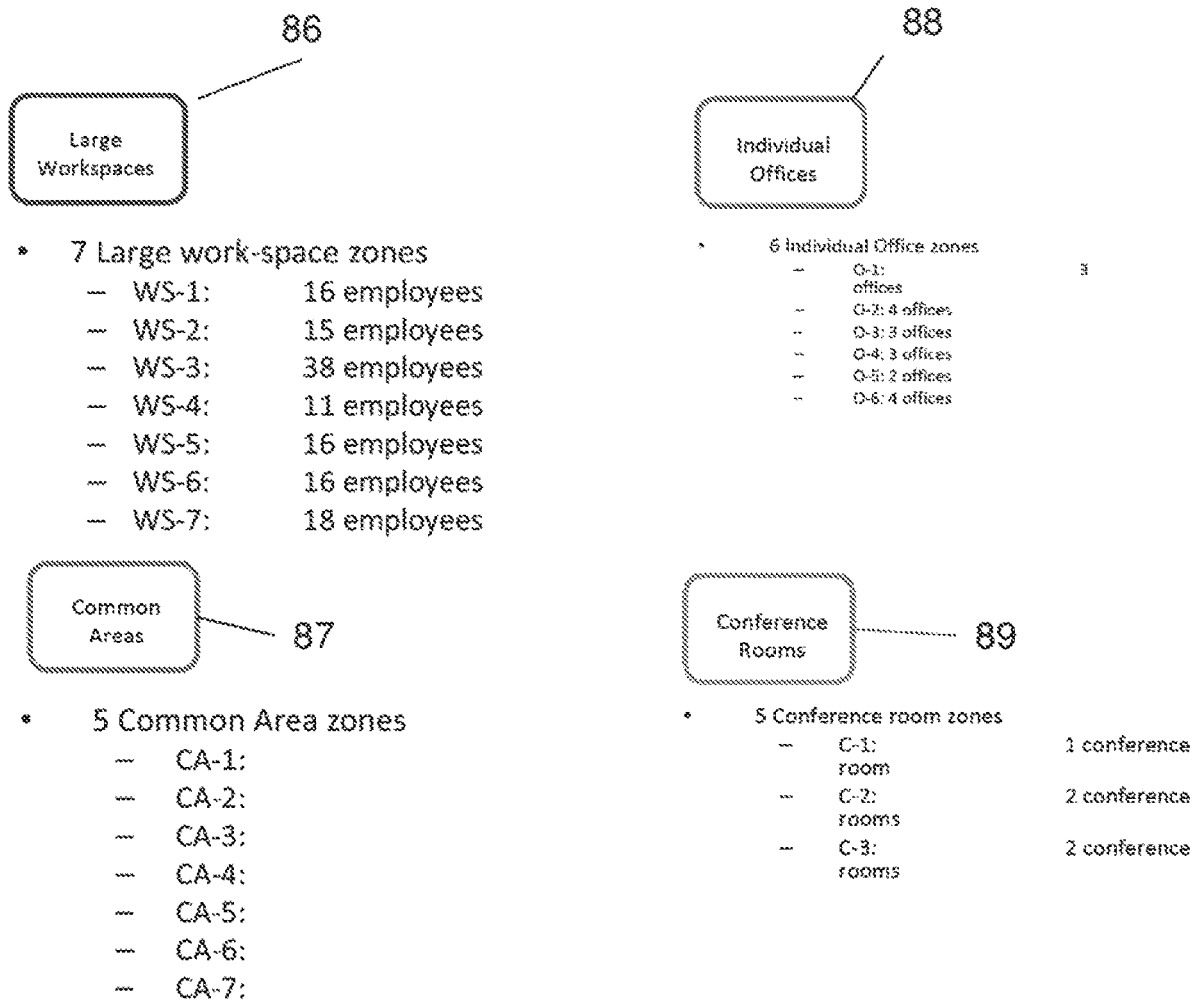
FIG. 4C is a table with summaries of information shown in the floor plan of FIG. 4B.

Turning now to FIGS. 4B and 4C, information used to populate table 44 may be obtained from a floor plan 85 (FIG. 4B) of a particular property, which as shown, has been segregated into various room types, such as large workspaces 86, common areas 87, individual offices 88, and conference rooms 89. In FIG. 4C, some of the room types have optionally been associated with additional information, such as typical occupancy levels (for Large Workspaces), and the number of rooms of a particular type, e.g., Individual Offices and Conference Rooms.

Report Generation and Aggregation Process

As mentioned hereinabove, embodiments of the present invention provide geo-located mobile application that allows employees and managers to report comfort levels and maintenance issues from anywhere, easily and instantaneously. This information is processed through a cloud-based report aggregation server(s) and shared with managers in real-time through a secure portal that provides comfort and maintenance information, optionally including preventive maintenance such as inspection lists, in aggregated reports. This data can be used to engage employees, improve workflow, drive operational savings, and optimize organizational performance.

These embodiments enable such report generation and aggregation in a real-time, web-based, client-server environment. While the present invention is discussed within the environment of the exemplary report aggregation facility 10, it will readily be appreciated that the present invention may be used in any number of environments including network and on-line based transaction facilities in business-to-business, business-to-consumer and consumer-to-consumer applications.

Figure 5:
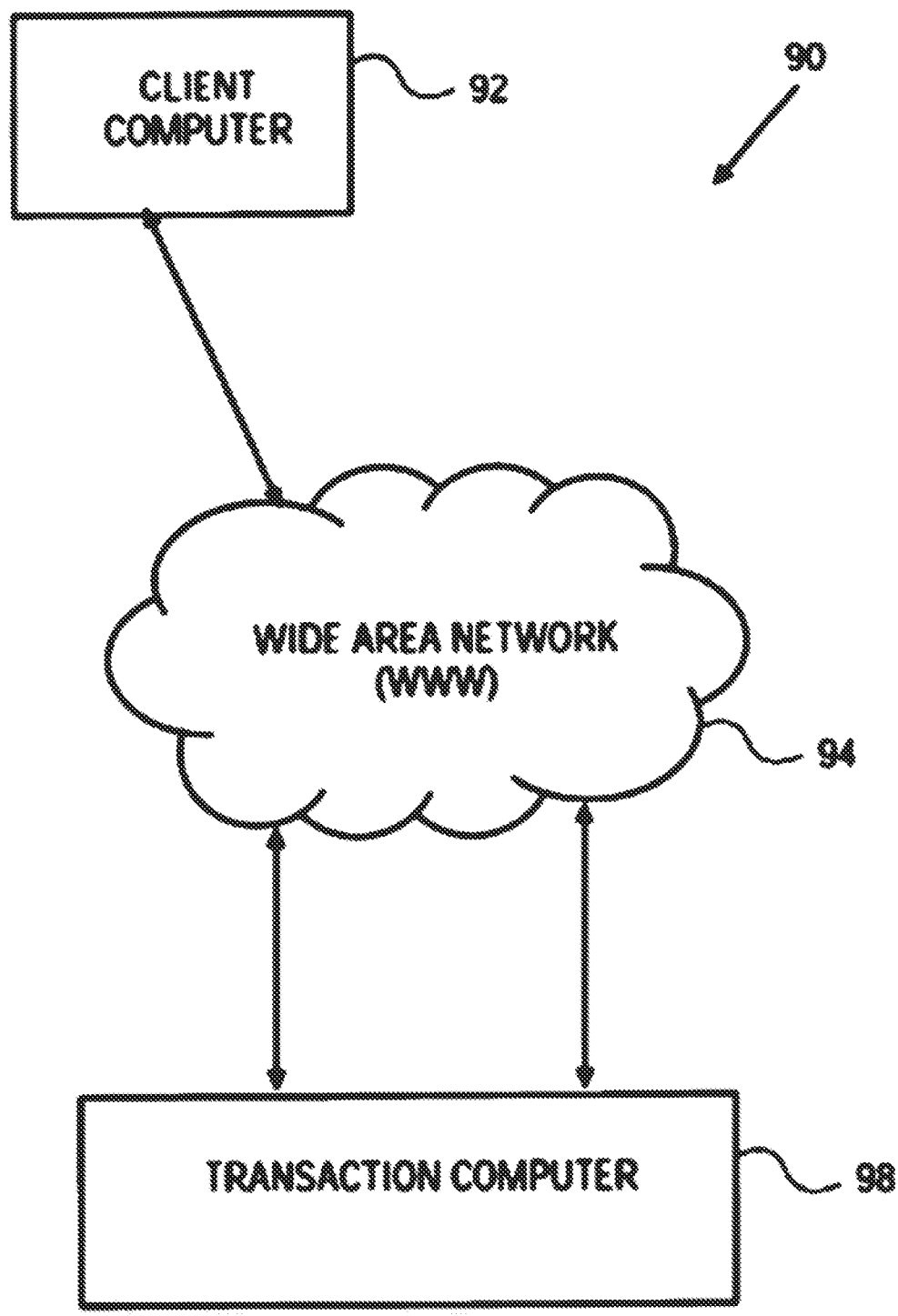
FIG. 5 is a simplified schematic diagram of one embodiment of a system within which aspects of the present invention may be embodied.

FIG. 5 is a simplified block diagram of a system 90 for generating reports in accordance with an exemplary embodiment of the present invention. In this embodiment, a client computer 92 is coupled to a transaction computer 98 via a communications network (e.g. a wide area network) 94. The client computer 92 represents a device that allows a user to interact with the report generation and aggregation facility 10 or any other transaction facility 98. In one embodiment, the client computer 92 presents to the user a report generation interface for generating reports and viewing content aggregated be the transaction computer 98.

Figure 1C:
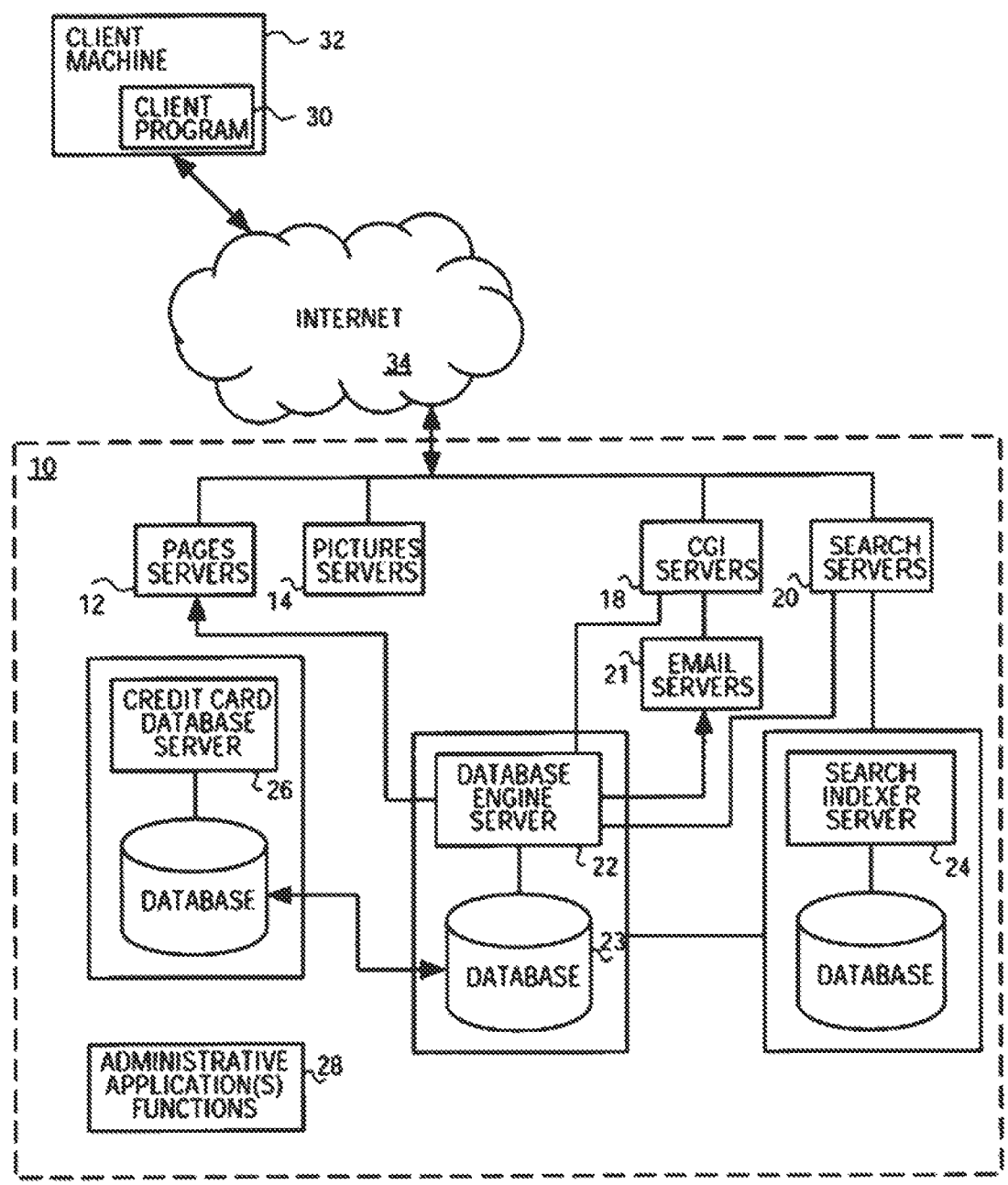
FIG. 1C is a block diagram of one embodiment of a network-based transaction facility according to an embodiment of the present invention.

The transaction computer 98, which supports a facility such as shown at 10 of FIG. 1C, handles transactions between various participants of the facility 10 including the user of the client computer 92. In one embodiment, the transaction computer 98 may initially receive the personal information of the participant from the client computer 92, and generate a subscription result which determines whether, and to what extent, the user is granted access to the facility 10. The transaction computer then facilitates the aggregation of reports in accordance with various user interfaces presented by the computer 98, via the client computer 92, to the user.

Figure 6:
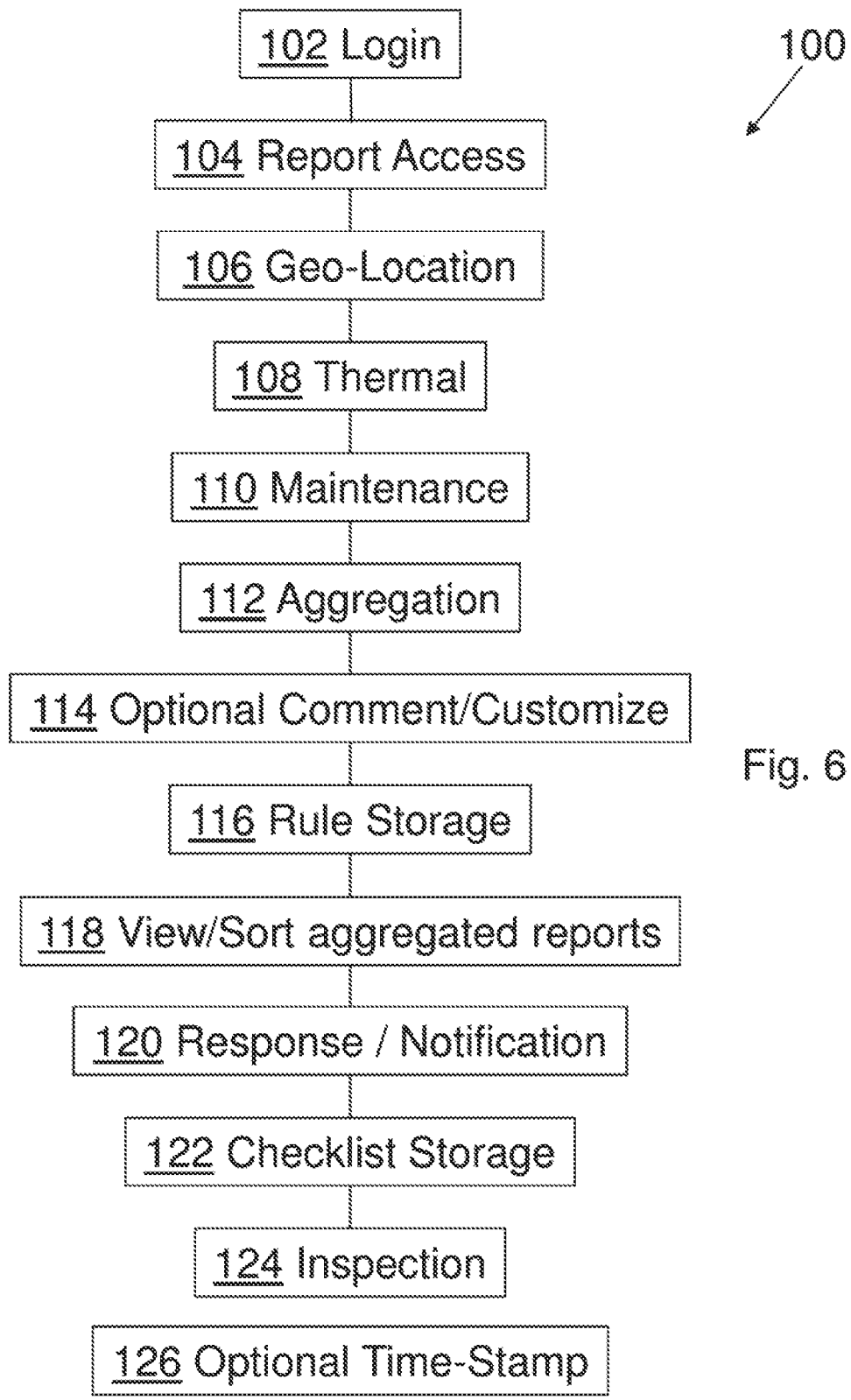
FIG. 6 is a block diagram of one embodiment of an interface sequence in accordance with embodiments of the present invention.

FIG. 6 shows a series 100 of interfaces/modules, such as may take the form of a series of objects (or methods), that may be implemented by the report aggregation facility 10, e.g., in combination with the various tables of database 23, for the purposes of generating and aggregating reports. The series 100 of interface modules shown in FIG. 6 will be described with reference to exemplary representations of the various interfaces as shown in FIGS. 8-18. It should be noted that the various modules may reside and operate on the facility 10 or alternatively, one or more of the modules, or components thereof, may be initially downloaded from the facility 10, e.g., as an application or "app", for installation on a user's smart phone, tablet or other user device 32. The skilled artisan will recognize that distribution of some components onto user devices may provide benefits such as reducing the amount of communication traffic between the user devices and the facility 10.

As shown, series 100 includes a login module 102, configured to generate a login interface through which a user of the facility 10 provides at least a user identifier and associated password. The login module may include a permissions module configured to provide selective access to the server by one or more users in accordance with permissions assigned to each user, e.g., based on whether the user is an employee of a building tenant or other building occupant, or whether the user is a manager or other responsible party having authority to address reports aggregated by the facility 10. Optionally, some users, such as the aforementioned manager, may also be requested to pay a subscription fee for access to the system.

Figure 8:
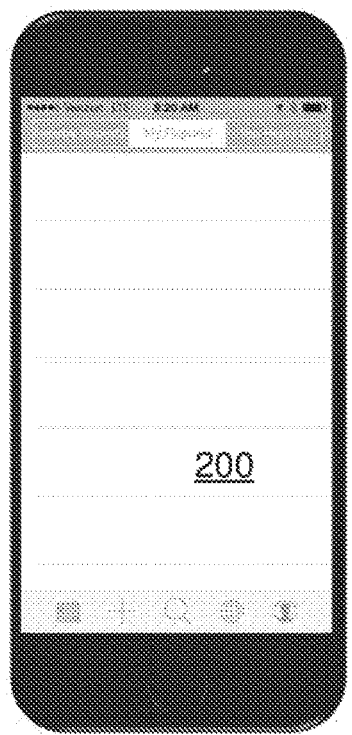
FIG. 8 is an exemplary representation of an interface included in the sequence of interfaces shown in FIG. 6.
Figure 9:
FIG. 9 is an exemplary representation of an interface included in the sequence of interfaces shown in FIG. 6.
Figure 10:
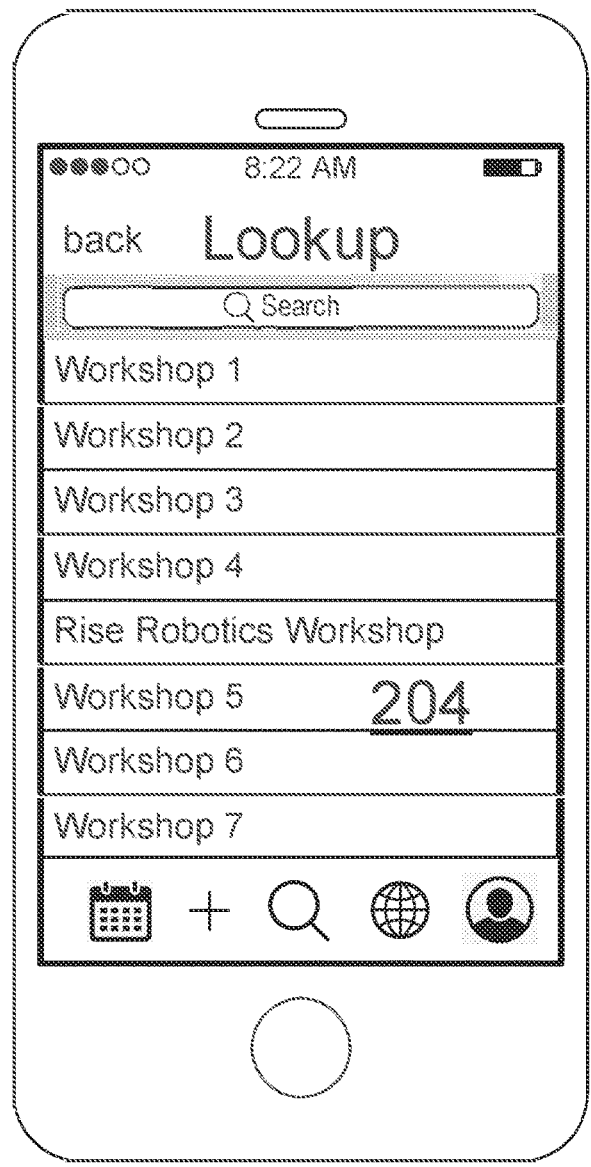
FIG. 10 is an exemplary representation of an interface included in the sequence of interfaces shown in FIG. 6.
Figure 11:
FIG. 11 is an exemplary representation of an interface included in the sequence of interfaces shown in FIG. 6.
Figure 12:
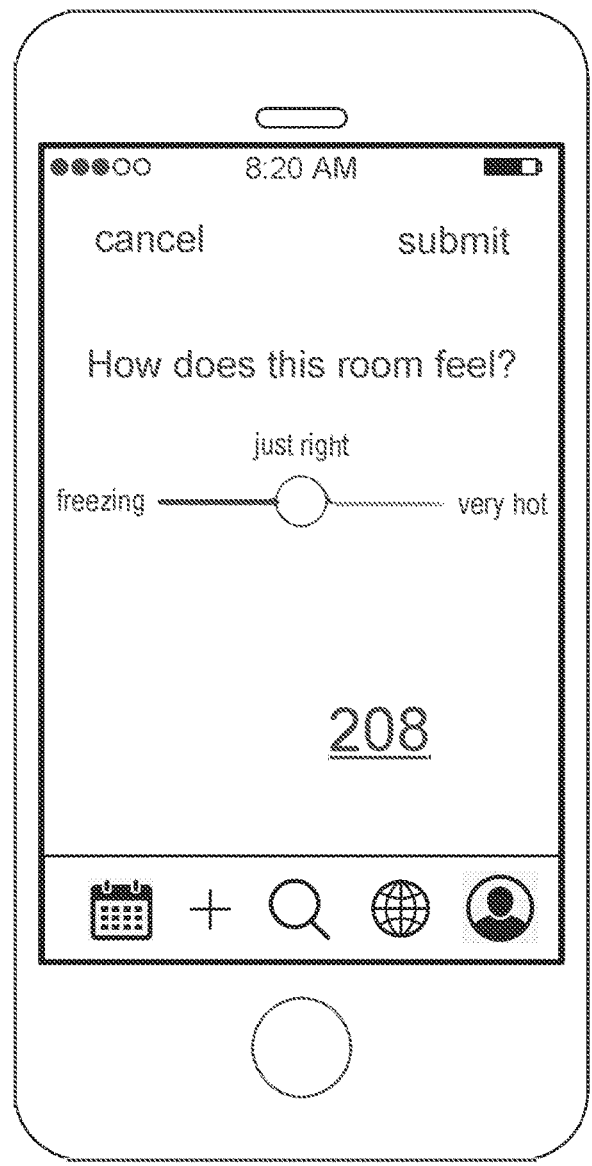
FIG. 12 is an exemplary representation of an interface included in the sequence of interfaces shown in FIG. 6.
Figure 13:
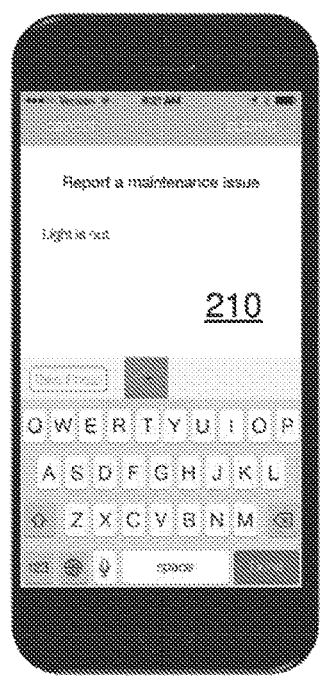
FIG. 13 is an exemplary representation of an interface included in the sequence of interfaces shown in FIG. 6.
Figure 14:
FIG. 14 is an exemplary representation of an interface included in the sequence of interfaces shown in FIG. 6.
Figure 15:
FIG. 15 is an exemplary representation of an interface included in the sequence of interfaces shown in FIG. 6.
Figure 16A:
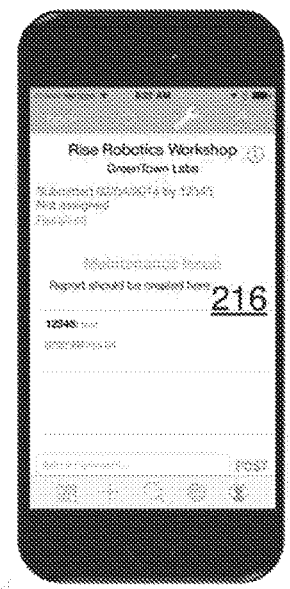
FIG. 16A is an exemplary representation of an interface included in the sequence of interfaces shown in FIG. 6.
Figure 16B:
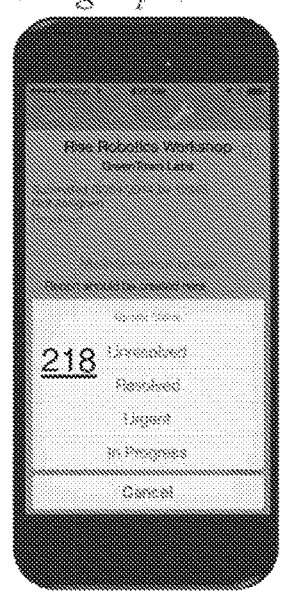
FIG. 16B is an exemplary representation of an interface included in the sequence of interfaces shown in FIG. 6.
Figure 16C:
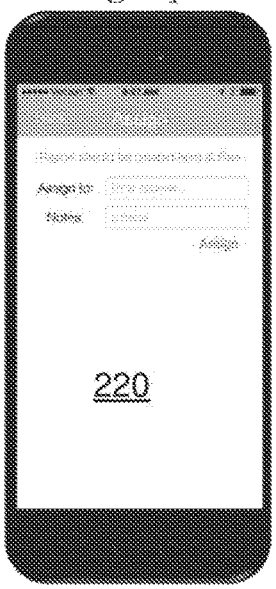
FIG. 16C is an exemplary representation of an interface included in the sequence of interfaces shown in FIG. 6.

A report access module 104 is configured to generate a report interface, such as shown at 200 in FIG. 8. Module 104 interacts with the various tables of database 23 (FIG. 1C) to enable a user to generate a new report by scanning a QR code at 202 (FIG. 9), using geo-location module 106, or by looking up a particular location, e.g., within a particular building at 204 (FIG. 10), which then permits the user to select the type of report at 206 (FIG. 11). Selecting "Rate Thermal Comfort" actuates thermal module 108, while selecting "Report a Maintenance Issue" actuates maintenance module 110, both of which permit the user to supply data, such as a thermal rating at 208 of FIG. 12 and/or a maintenance request at 210 of FIG. 13. An optional time-stamp module 126 is configured to store a time stamp denoting the time of creation and/or storage at the server, of each building report.

Figure 17:
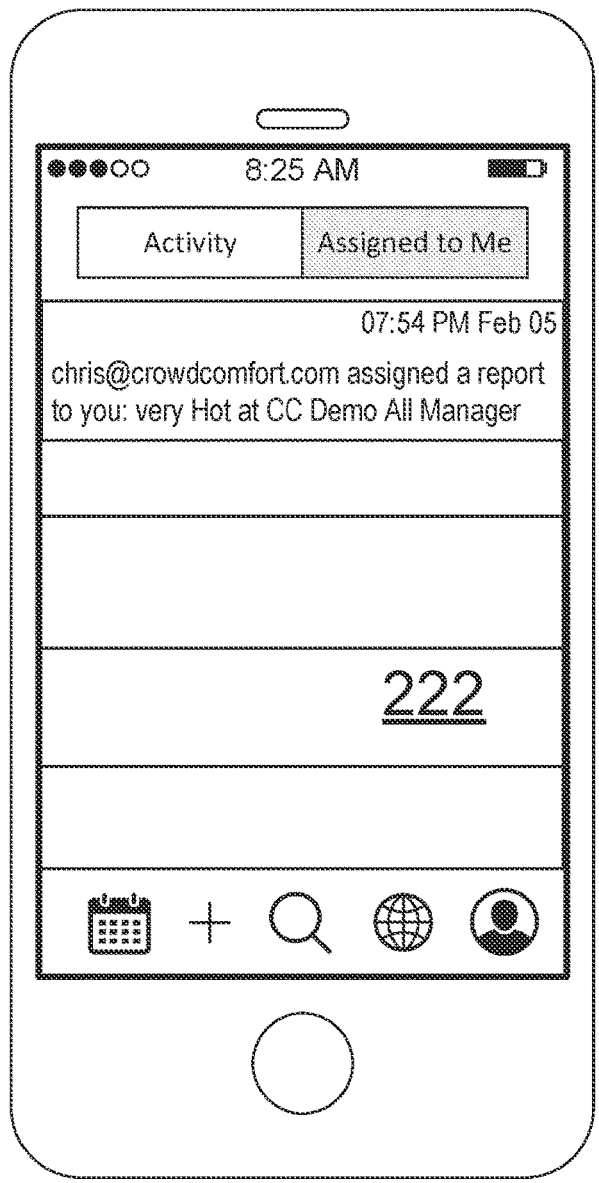
FIG. 17 is an exemplary representation of an interface included in the sequence of interfaces shown in FIG. 6.

The reports are uploaded from the user devices 32 to the facility 10 (FIG. 1C) where aggregation module 112 aggregates and stores them in database 23 (FIG. 2). An optional Comment/Customize module 114 permits a user to add custom text or images to the report, such as at 210 of FIG. 13, and/or to comment on others' reports, such as by selecting the 'agree' icon to support others' reports as shown at 212 of FIG. 14. Rule Storage module 116 enables rules to be uploaded for storage in tables 45, 46, 50 and/or 52 (FIG. 2), and/or accessed during responses as discussed hereinbelow. View/Sort module 118 actuates the interfaces 212 and 214 of FIGS. 14 and 15 to display aggregated reports from one or more users. Response/Notification module 120 actuates interfaces 216, 218 and 220 of FIGS. 16A-16C, which permit the user, which in this instance is a responsible party such as a manager having relatively high level permissions, to access the system to select specific reports to see detail and manage reports. Examples include adding a detailed comment (FIG. 16A), entering or changing status of a report, e.g., 'resolved' (FIG. 16B), which may include automatically notifying the user who originally submitted the report, and/or assigning the report to another user (colleague) for appropriate action (FIG. 16C), which may also include automatically notifying the assignee. It is noted that the notifications provided by module 120 may be accomplished automatically in any convenient manner, such as via email, text, etc., or via in-app notification, using email/communication server 21 (FIG. 1C). An example of an in-app notification is shown in FIG. 17, in which an 'assigned to me' interface 222 may display all reports that have been assigned to a particular user for resolution.

In addition to automatic notifications, response module 120 may also provide other automatic responses. For example, module 120 may automatically adjust building controls (e.g., HVAC controls) in accordance with the pre-determined rules, e.g., comfort rule table 50, for the particular property, which may be accessed by rule storage module 116. One example of a rule table 50 is shown in FIG. 4D. In this example, system 10 has received and aggregated temperature reports from 30 out of 38 users located in a particular HVAC zone. As also shown, 20 of the users are requesting a temperature increase, while 5 are requesting a decrease, and 5 are requesting no temperature change. The rule table includes a weighting rule, which in this example, is pro rata, with 50 percent of the neutral 'no change' weightings being subtracted from each of the 'increase' and 'decrease' weights. An increase/decrease weighting rule subtracts the 'decrease' weighting from the 'increase' weighting, to yield a net weighting which if positive, corresponds to a percentage increase, and if negative corresponds to a percentage decrease of the 'Max Change' in temperature parameter. In the example shown, the aggregated reports produce a net weighting of +0.50 which dictates a positive adjustment of 50 percent of the 'Max Change' parameter of 5 degrees, to yield a recommended increase of 2.5 degrees. This recommended change may be effected automatically, by a transmission to the building HVAC system, or alternatively, may be sent to the interface 218 of FIG. 16B for action by a manager or other responsible party.

Figure 18:
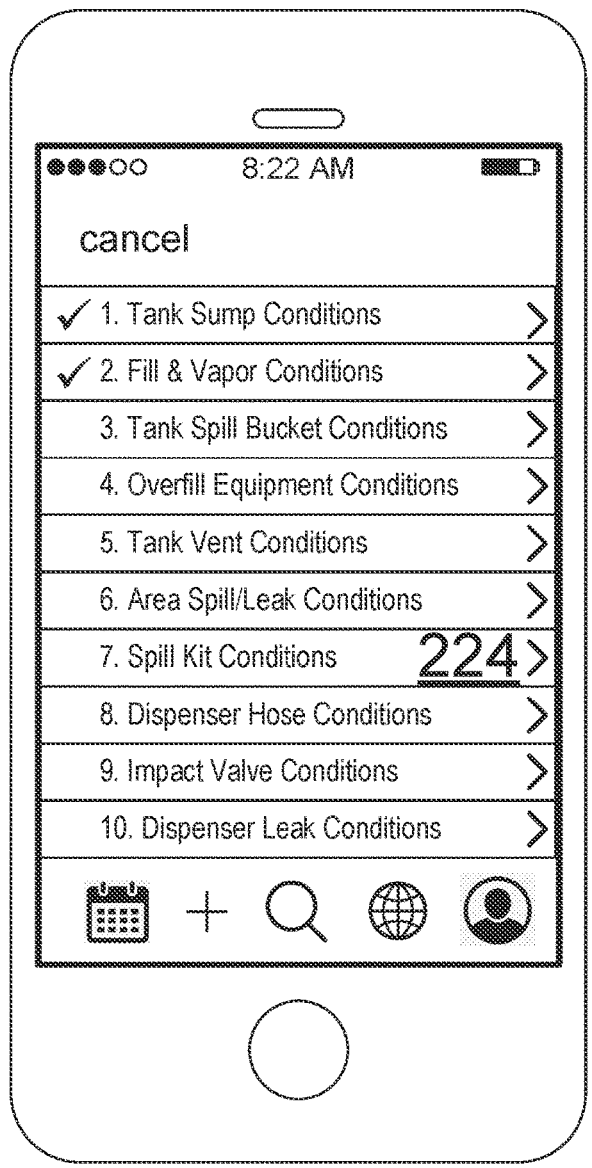
FIG. 18 is an exemplary representation of an interface included in the sequence of interfaces shown in FIG. 6.

Response module 120 may also include an inspection module 122 configured to generate and populate a checklist display 224 such as shown in FIG. 18. The checklist interface enables a user to identify, e.g., with a checkmark, the particular asset being inspected. Aggregation module 124 serves to store and aggregate the various reports, including any comments/customization and responses, while also providing various reporting capabilities such as shown at 82 of FIG. 1B, and as will be discussed in greater detail hereinbelow.

Exemplary methods associated with system 100 of the present invention, will now be described as illustrated by the flow chart of FIGS. 7A and 7B.

Figure 7A:
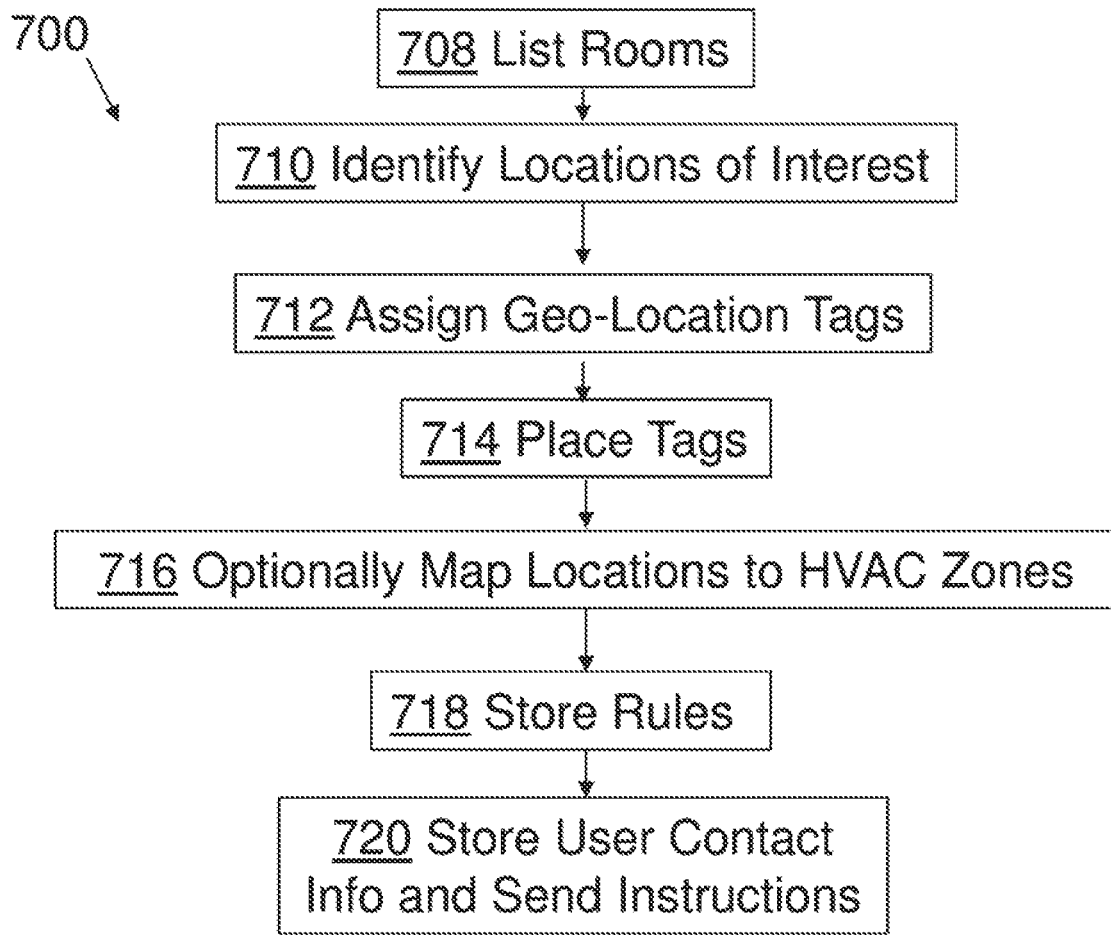
FIG. 7A is a flow chart of one embodiment for a method of the present invention.

Referring now to FIG. 7A, a method 700 for configuring the system for environmental comfort use at a particular property is shown and described. At 708, a list of rooms, including common areas, for the property is obtained, e.g., using floor plans such as shown in FIG. 4B, or created by touring the property and counting rooms, etc. At 710, a list of locations of interest within the rooms is generated. At 712, unique tags, such as individualized QR Codes, are generated for each location of interest. At 714, the tags are placed at the locations of interest, e.g., by printing the QR Codes onto markers which are physically placed at their corresponding locations. It should be noted that the locations of interest may be determined as granularly as desired. For example, a single room may have multiple tags, such as to capture comfort data at opposite ends of a large conference table. At 716, each location of interest is optionally mapped to an HVAC zone in the building. At 718, a set of rules (e.g., comfort, maintenance, inspection, etc.) rules is set for the particular property, e.g., to determine how often and how much the temperature can be changed by the system within an HVAC zone, etc. At 720, user contact information is captured and stored to table(s) 40, and notification, e.g., by email, text, social media, etc., is sent to employees or occupants of the property letting them know about the system and providing instruction on how to use it.

Figure 7B:
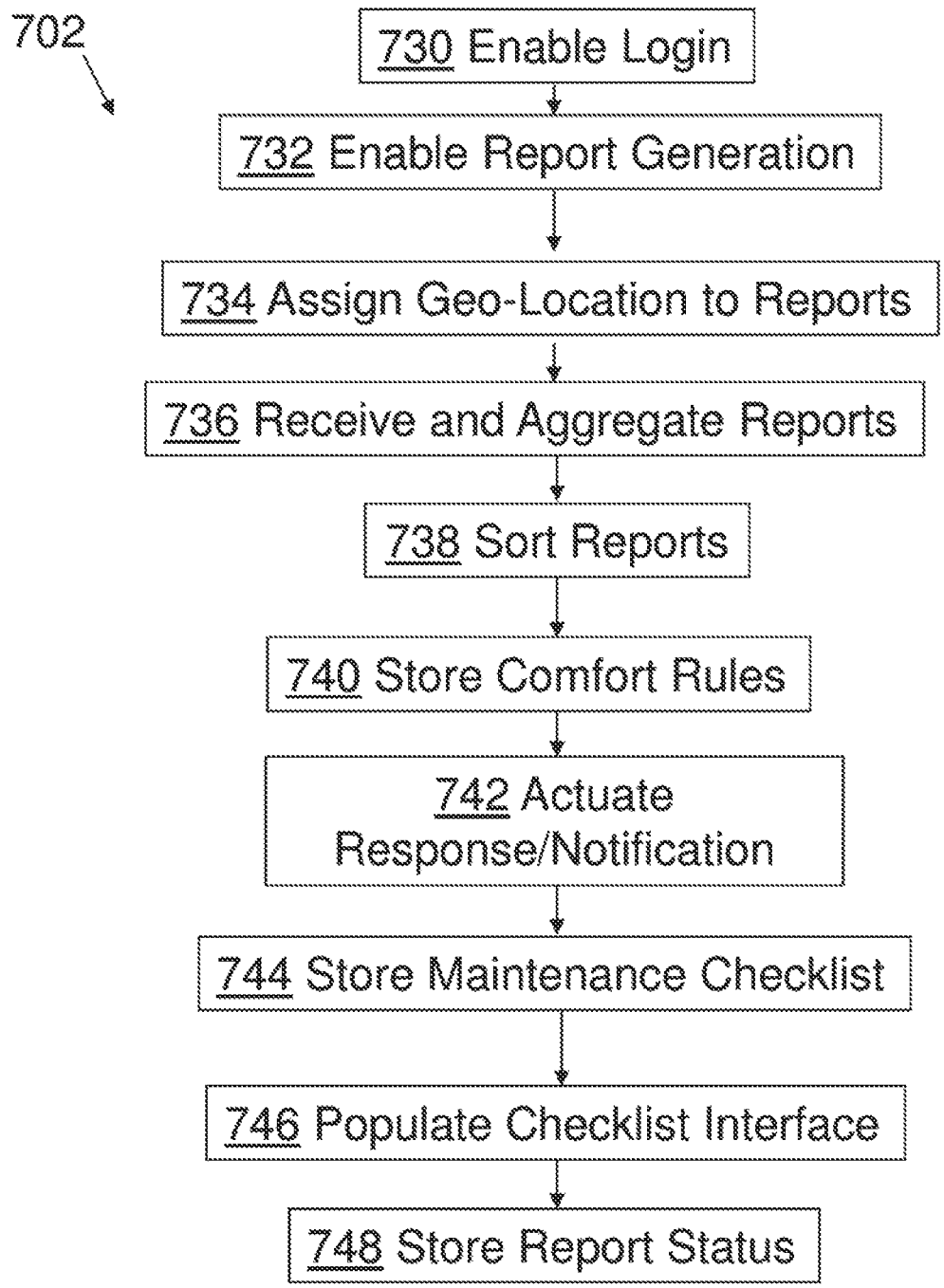
FIG. 7B is a flow chart of another embodiment for a method of the present invention.

Referring now to FIG. 7B, a method 702 for operating system 100 is shown and described. As shown, the method 702 commences with enabling the login module at 730 to provide user interface information to a user of the transaction facility at client 32 (FIG. 1). More specifically, the user interface information may provide a login interface via login module 102 (FIG. 6). Subsequent to the login by the user, at 732 the report access module is actuated to generate a report interface displayable on the client computers to enable the users to generate one or more building reports in the form of (i) thermal reports using a thermal report module, and/or (ii) maintenance reports using a maintenance report module. At 734, the geo-location module 106 is actuated to assign a location within the building to each building report. At 736, the aggregation module 112 is actuated to receive the building reports from the client computers, and to store and aggregate the building reports at the server. At 738, the View/Sort module 118 sorts the aggregated reports according to their assigned locations, and transmits the sorted reports to the one or more client computers for display. At 740, rule storage module 116 is actuated to store any comfort rules for the building that have not previously been loaded into database 23 (FIG. 1C). At 742, Response/Notification module 120 is actuated to (i) permit a manager at a client computer to access the server to select for response, and assign a response status, to particular reports, and/or (ii) automatically respond and assign a response status to particular reports in accordance with said set of comfort rules. At 744, checklist storage module 122 is actuated to store a list of preventative maintenance items for the building. At 746, inspection module 124 is actuated to generate and populate a checklist interface on the user device, the checklist interface configured to display the list of preventative maintenance tasks, each of the tasks being user-selectable to designate completion of each individual task. At 748, the aggregation module 112 is actuated to store the status of the reports.

Figure 7C:
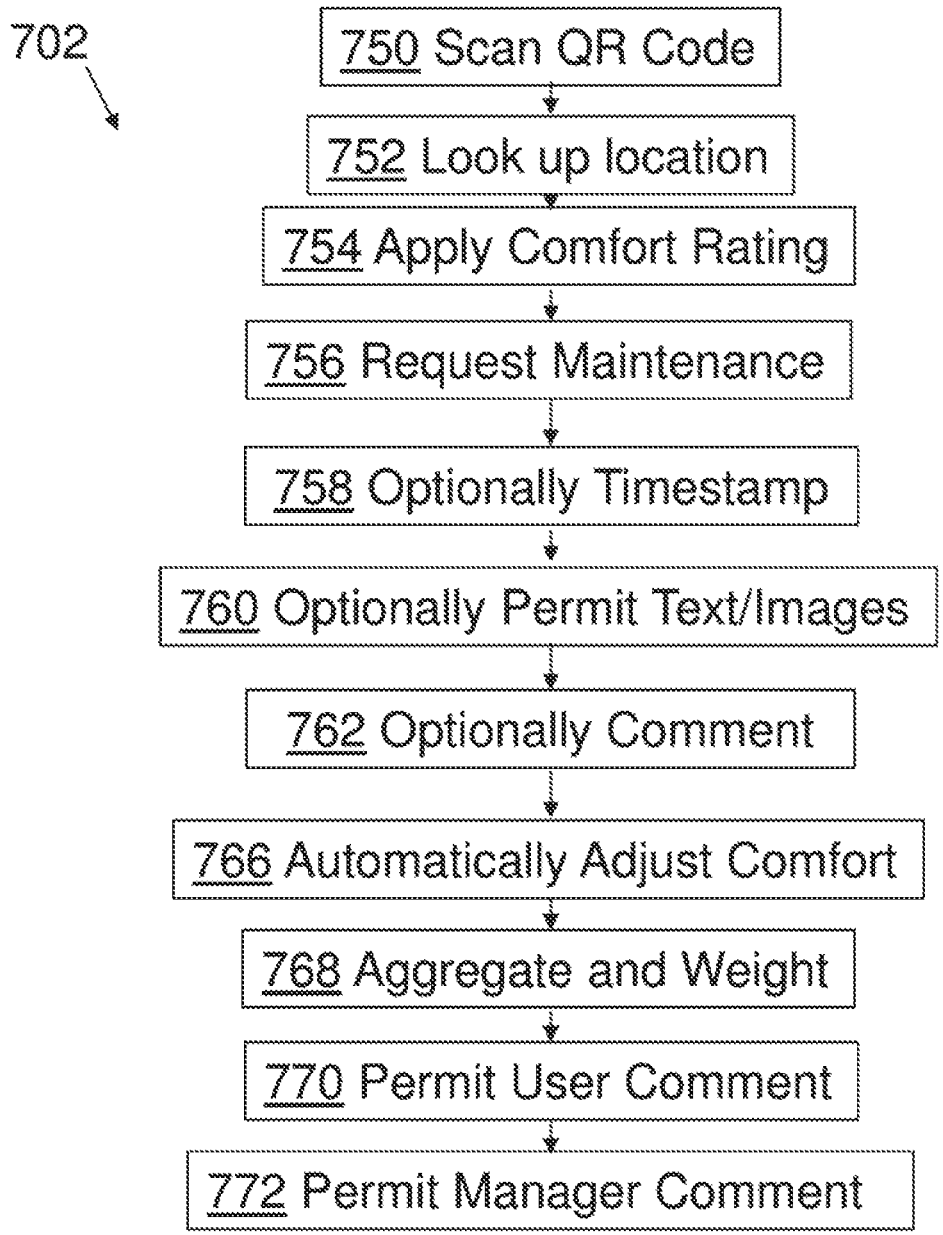
FIG. 7C is a flow chart of another embodiment for a method of the present invention.

Various optional additions to method 702 are shown in flowchart 704 of FIG. 7C. As shown, at 750, report access module 104 is actuated to permit a client computer to generate a building report by scanning a QR code disposed at a predetermined location within the building. At 752, report access module 104 is actuated to permit a client computer to generate a building report by looking up a particular location within the building. At 754, report access module 104 is actuated to permit a client computer to apply a thermal comfort rating to one or more of the thermal reports. At 756, report access module 104 is actuated to permit a client computer to apply a maintenance request to one or more maintenance reports. At 758, optional timestamp module 126 is actuated to store a time stamp denoting the time of creation and/or storage at the server, of each building report. At 760, optional Comment/Customize module 114 is actuated to permit a user at a client computer to add custom text and/or images to a report. At 762, step 760 further includes permitting the user to comment on reports. At 766, Response/Notification module 120 is actuated to automatically adjust the environmental control system in accordance with the predetermined rules for the building. At 768, Response/Notification module 120 is configured to aggregate and assign weights to reports associated with a particular location, and to use the weights to generate a control signal to adjust one or more operational parameters of the environmental control system. At 770, Response/Notification module 120 is actuated to permit a user, via the one or more client computers, to add a comment to one or more reports. At 772, step 770 further includes permitting a manager, via the one or more client computers, to assign one or more reports to one or more particular users for response.

It should be recognized that in the embodiments shown and described hereinabove, heat maps, such as shown at 82 in FIG. 1B, may be automatically generated and displayed in the user device interface(s) once thermal reports are aggregated. Moreover, as reports come in notifications may be provided directly to the individuals who need them. For example a comfort report may be delivered directly to the smart phone device of the person who manages the building management system, but a report on the generator may go to the device of an appropriate Environmental Health and Safety professional.

Particular embodiments may also be configured to accept an initiation of a temperature change by any individual who works in a particular zone. This process may be generally the same for every kind of occupied office space except the individual office on a single room zone. In that case, the occupant could increase the set-point on his or her own (within normal set-point ranges).

In addition to the rules in the temperature adjustment example shown and described hereinabove, the temperature change mechanism may have any number of additional rules, such as those that limit the number of changes that can be initiated by per day or per hour. Moreover, the rules may be space (zone) specific. The rules are typically set by the employer, or building manager and may be adjusted easily as needed.

Once a temperature change is initiated all of the employees in the zone may be notified by any convenient method. An exemplary notification may state:

"An individual in your zone is uncomfortable and has requested a temperature change. Your feedback is important so please let us know your preference to increase, decrease or maintain the current temperature. To do so please open the CrowdComfort application and provide your choice. In order for us to account for your temperature preference we will need your participation within 5 minutes of receipt of this notice."

After the 5 minute period the votes may be tabulated by embodiments of the present invention.

It should also be recognized that data may be gathered an accumulated and a profile generated for each user submitting a comfort report. For individuals that are often uncomfortable, managers may begin to address their levels at an individual level as opposed to at the system/zone level. Moreover, users who are habitual outliers may be accorded less weight than other users. Still further, although QR Codes have been shown and described as a convenient geo-location device, other approaches for geo-location may include Wi-Fi, Bluetooth, I-Beacon, RFID or other location method to send the notification only to people within a particular zone.

It should also be recognized that although the various embodiments have been shown and described with respect to particular buildings, the embodiments need not be limited solely to interior applications. Rather, the embodiments may be applied to various property types, including buildings and campuses having both interior and exterior locations of interest, including rooftop decks and equipment, courtyards, patios, etc., for which it may be desirable to receive and aggregate comfort, maintenance, and/or inspection reports.

Figure 19:
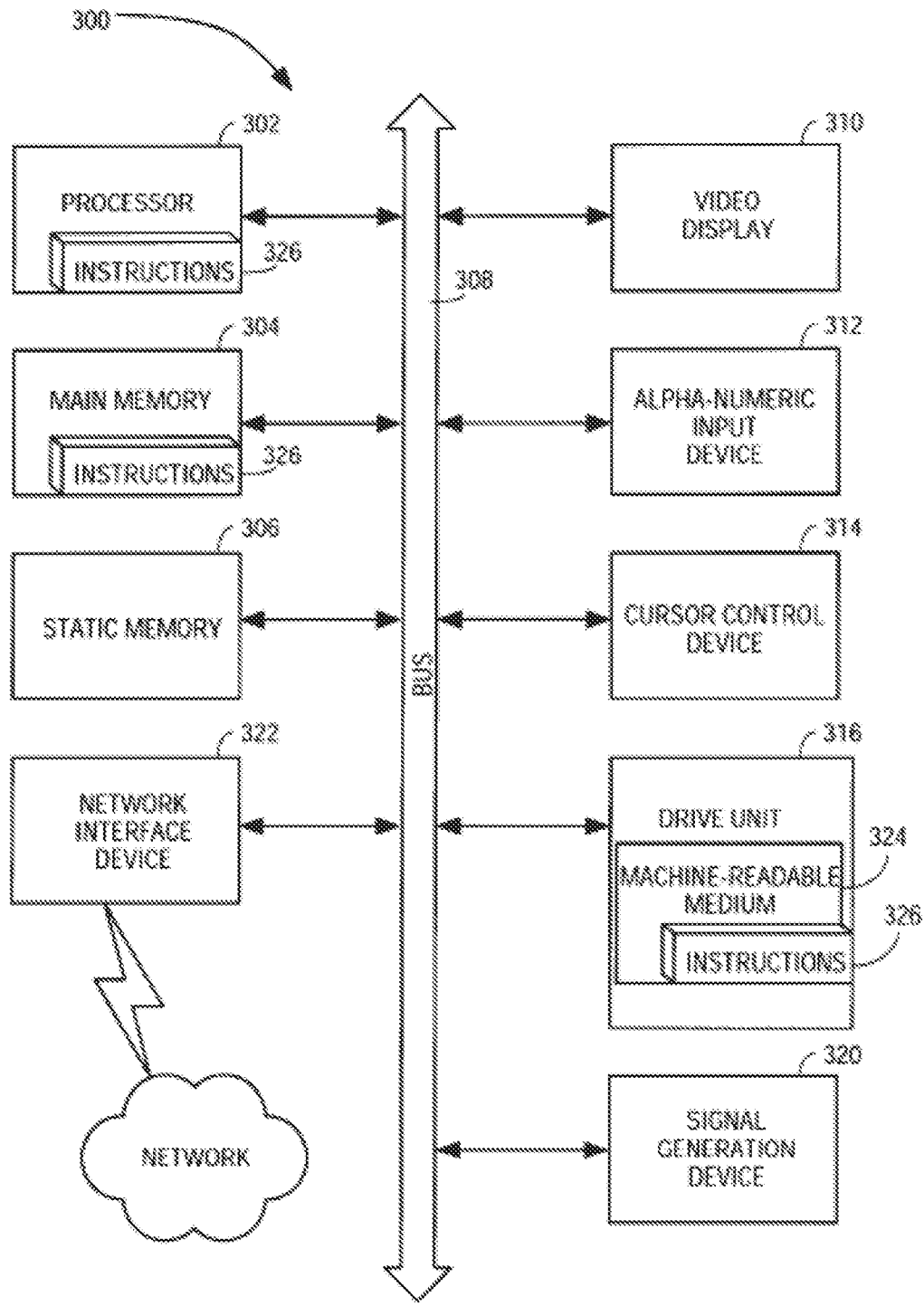
FIG. 19 is a block diagram of one embodiment of a computer system usable in various aspects of the present invention.

FIG. 19 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310

(e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A non-transitory computer implemented system in a client-server environment, for crowd-sourced real-time, site-specific environmental compliance reporting, the system comprising a computer server system having at least one processor and at least one memory storing computer program instructions which, when executed by the at least one processor, cause the computer server system to perform processes comprising:
maintaining in at least one memory a floor plan of the building, the floor plan including a plurality of locations, each location associated with a scannable tag;
providing selective access to users via one or more client computers, each client computer running a smart device application communicably coupled to the server system via a wireless computer communication system, the users including (i) occupants of the building having first level permissions and (ii) managers having second level permissions, wherein said selective access is granted based on said permissions;
generating and storing a list of maintenance tasks for the building based on building reports received from the smart device application of one or more occupant client computers via the wireless computer communication system, each maintenance task associated with a given location of the building and relating to comfort and/or maintenance of the location;
generating and populating a checklist graphical user interface for display on the smart device application of one or more manager client computers, the checklist graphical user interface configured to display the list of maintenance tasks with each of the tasks being user-selectable via the checklist graphical user interface to designate completion of individual tasks and further configured to receive via the checklist graphical user interface inspection reports from managers including user-selected completion of individual maintenance tasks, each inspection report associated with a tag scanned via the smart device application;
receiving the inspection reports via the wireless computer communication system;
assigning a location within the building to each inspection report based on the scanned tags and the floor plan of the building;
storing a time stamp denoting time of creation or storage of each inspection report;
providing access to inspection reports via the smart device application of client computers, the smart device application permitting occupants and managers to add custom text or image information to inspection reports stored by the computer server system for viewing by other users, the custom text or image information relating to one or more maintenance tasks;
aggregating the inspection reports based on assigned locations and time stamps;
automatically responding and assigning a response status to the aggregated inspection reports including converting the aggregated inspection reports into work orders and transmitting each work order to a responsible manager client computer to address the custom text or image information and complete the maintenance task relating to the aggregated inspection reports; and
proactively delivering status information on the maintenance tasks via the wireless computer communication system for display on client computers including access to information added to inspection reports by occupants and managers.

2. A system according to claim 1, wherein the added information comprises custom text and/or images related to a selected maintenance task.

3. A system according to claim 1, wherein the added information comprises user comments and/or feedback related to a selected maintenance task.

4. A system according to claim 1, wherein the added information comprises a user rating related to a selected maintenance task.

5. A system according to claim 1, wherein the individual maintenance tasks relate to cleanliness of a plurality of locations.

6. A system according to claim 5, wherein the plurality of locations include at least one of restrooms, office spaces, conference rooms, event spaces, or common spaces.

7. A system according to claim 1, the processes further comprising:
generating a report interface displayable on the client computer of a user to enable the user to generate one or more building reports in the form of (i) thermal reports and/or (ii) maintenance reports.

8. A system according to claim 7, wherein the report interface is generated in response to the user scanning a QR code disposed at a predetermined location within the building using the client computer.

9. A system according to claim 7, wherein the report interface is generated in response to the user looking up a particular location within the building.

10. A system according to claim 7, wherein the processes further comprise:
updating the list of maintenance tasks for the building based on the one or more building reports.

11. A non-transitory computer implemented method in a client-server environment, for crowd-sourced real-time, site-specific environmental compliance reporting, the method comprising:
maintaining in at least one memory a floor plan of the building, the floor plan including a plurality of locations, each location associated with a scannable tag;
providing, by a computer server system having at least one processor, selective access to users via one or more client computers, each client computer running a smart device application communicably coupled to the server system via a wireless computer communication system, the users including (i) occupants of the building having first level permissions and (ii) managers having second level permissions, wherein said selective access is granted based on said permissions;
generating and storing, by the computer server system, a list of maintenance tasks for the building based on building reports received from the smart device application of one or more occupant client computers via the wireless computer communication system, each maintenance task associated with a given location of the building and relating to comfort and/or maintenance of the location;
generating and populating, by the computer server system, a checklist graphical user interface for display on the smart device application of one or more manager client computers, the checklist graphical user interface configured to display the list of maintenance tasks with each of the tasks being user-selectable via the checklist graphical user interface to designate completion of individual tasks and further configured to receive via the checklist graphical user interface inspection reports from managers including user-selected completion of individual maintenance tasks, each inspection report associated with a tag scanned via the smart device application;
receiving, by the computer server system, the inspection reports via the wireless computer communication system;
assigning, by the computer server system, a location within the building to each inspection report based on the scanned tags and the floor plan of the building;
storing, by the computer server system, a time stamp denoting time of creation or storage of each inspection report;
providing, by the computer server system, access to inspection reports via the smart device application of client computers, the smart device application permitting occupants and managers to add custom text or image information to inspection reports stored by the computer server system for viewing by other users, the custom text or image information relating to one or more maintenance tasks;
aggregating, by the computer server system, the inspection reports based on assigned locations and time stamps;
automatically responding and assigning a response status to the aggregated inspection reports including converting the aggregated inspection reports into work orders and transmitting each work order to a responsible manager client computer to address the custom text or image information and complete the maintenance task relating to the aggregated inspection reports; and
proactively delivering, by the computer server system, status information on the maintenance tasks via the wireless computer communication system for display on client computers including access to information added to inspection reports by occupants and managers.

12. A method according to claim 11, wherein the added information comprises custom text and/or images related to a selected maintenance task.

13. A method according to claim 11, wherein the added information comprises user comments and/or feedback related to a selected maintenance task.

14. A method according to claim 11, wherein the added information comprises a user rating related to a selected maintenance task.

15. A method according to claim 11, wherein the individual maintenance tasks relate to cleanliness of a plurality of locations.

16. A method according to claim 15, wherein the plurality of locations include at least one of restrooms, office spaces, conference rooms, event spaces, or common spaces.

17. A method according to claim 11, further comprising:
generating, by the computer server system, a report interface displayable on the client computer of a user to enable the user to generate one or more building reports in the form of (i) thermal reports and/or (ii) maintenance reports.

18. A method according to claim 17, wherein the report interface is generated in response to the user scanning a QR code disposed at a predetermined location within the building using the client computer.

19. A method according to claim 17, wherein the report interface is generated in response to the user looking up a particular location within the building.

20. A method according to claim 17, wherein the report access module is configured to permit a client computer to provide a rating to one or more of the building reports further comprising:
updating, by the computer server system, the list of maintenance tasks for the building based on the one or more building reports.

21. A method according to claim 11, wherein the client computers include portable client computers that are communicably coupled to the server system over a wireless communication system.

22. A method according to claim 11, wherein the first level permissions are based at least in part on subscription status of the users.

23. A system according to claim 1, wherein the client computers include portable client computers that are communicably coupled to the server system over a wireless communication system.

24. A system according to claim 1, wherein the first level permissions are based at least in part on subscription status of the users.

25. A computer program product comprising at least one tangible, non-transitory computer-readable medium having embodied therein computer program instructions for crowd-sourced real-time, site-specific environmental compliance reporting which, when executed by at least one processor of a computer server system, cause the computer server system to perform processes comprising:

maintaining in at least one memory a floor plan of the building, the floor plan including a plurality of locations, each location associated with a scannable tag;

providing selective access to users via one or more client computers, each client computer running a smart device application communicably coupled to the server system via a wireless computer communication system, the users including (i) occupants of the building having first level permissions and (ii) managers having second level permissions, wherein said selective access is granted based on said permissions;

generating and storing a list of maintenance tasks for the building based on building reports received from the smart device application of one or more occupant client computers via the wireless computer communication system, each maintenance task associated with a given location of the building and relating to comfort and/or maintenance of the location;

generating and populating a checklist graphical user interface for display on the smart device application of one or more manager client computers, the checklist graphical user interface configured to display the list of maintenance tasks with each of the tasks being user-selectable via the checklist graphical user interface to designate completion of individual tasks and further configured to receive via the checklist graphical user interface inspection reports from managers including user-selected completion of individual maintenance tasks, each inspection report associated with a tag scanned via the smart device application;

receiving the inspection reports via the wireless computer communication system;

assigning a location within the building to each inspection report based on the scanned tags and the floor plan of the building;

storing a time stamp denoting time of creation of each inspection report;

providing access to inspection reports via the smart device application of client computers, the smart device application permitting occupants and managers to add custom text or image information to inspection reports stored by the computer server system for viewing by other users, the custom text or image information relating to one or more maintenance tasks;

aggregating the inspection reports based on assigned locations and time stamps;

automatically responding and assigning a response status to the aggregated inspection reports including converting the aggregated inspection reports into work orders and transmitting each work order to a responsible manager client computer to address the custom text or image information and complete the maintenance task relating to the aggregated inspection reports; and proactively delivering status information on the maintenance tasks via the wireless computer communication system for display on client computers including access to information added to inspection reports by occupants and managers.

\* \* \* \* \*